United States Patent
Li et al.

(10) Patent No.: US 6,580,515 B1
(45) Date of Patent: Jun. 17, 2003

(54) SURFACE PROFILING USING A DIFFERENTIAL INTERFEROMETER

(75) Inventors: Guoguang Li, Fremont, CA (US); Rajeshwar C. Chhibber, San Jose, CA (US)

(73) Assignee: Nanometrics Incorporated, Milpitas, CA (US)

( * ) Notice: Subject to any disclaimer, the term of this patent is extended or adjusted under 35 U.S.C. 154(b) by 0 days.

(21) Appl. No.: 09/870,350

(22) Filed: May 29, 2001

(51) Int. Cl.$^7$ ............................................... G01B 11/02
(52) U.S. Cl. ...................................................... 356/516
(58) Field of Search ................... 356/516, 489, 356/495

(56) References Cited

U.S. PATENT DOCUMENTS

| | | | |
|---|---|---|---|
| 5,314,843 A | 5/1994 | Yu et al. | 437/225 |
| 5,348,002 A | 9/1994 | Caro | 128/633 |
| 5,555,471 A | 9/1996 | Xu et al. | 356/357 |
| 5,784,163 A | 7/1998 | Lu et al. | 356/351 |
| 5,872,629 A | 2/1999 | Colvard | 356/349 |
| 5,874,318 A | 2/1999 | Baker et al. | 438/8 |
| 5,914,782 A * | 6/1999 | Sugiyama | 356/516 |
| 5,953,115 A | 9/1999 | Landers et al. | 356/237 |
| 5,983,167 A | 11/1999 | Ebisawa | 702/167 |
| 6,238,592 B1 | 5/2001 | Hardy et al. | 252/79.1 |
| 6,340,602 B1 | 1/2002 | Johnson et al. | 438/7 |
| 6,392,749 B1 | 5/2002 | Meeks et al. | 356/381 |
| 6,392,752 B1 * | 5/2002 | Johnson | 356/516 |

FOREIGN PATENT DOCUMENTS

| | | |
|---|---|---|
| EP | EL 0 831 295 A1 | 3/1998 |
| EP | 0 982 774 A2 | 3/2000 |
| WO | WO 00/54325 | 9/2000 |

OTHER PUBLICATIONS

Kim, Gee–Hong et al., "White light scanning interferometry for thickness measurement of thin film layers" SPIE vol. 3783 (1999), pp. 239–246.*

Makosch, G., "LASSI—a scanning differential ac interferometer for surface profile and roughness measurement" SPIE vol. 1009 (1988); pp. 244–253.*

(List continued on next page.)

Primary Examiner—Robert H. Kim
Assistant Examiner—Thomas R Artman
(74) Attorney, Agent, or Firm—Silicon Valley Patent Group LLP; Michael J. Halbert

(57) ABSTRACT

A differential interferometer is used to measure the step height between a reference region and at least one point in a measurement region using the relative phase difference as well as the measured reflectance from at least the point in the measurement region. The measured reflectance can be derived from the information provided by the differential interferometer. The measured reflectance from the reference region can also be used to provide a step height measured, where, e.g., the reference region has a changing thickness. Where the measurement region includes a composite material, e.g., copper and silicon dioxide, the step height between the reference region and the measurement region may be determined by including the area fraction or the height difference of the materials in the composite material in the final determination of the step height.

25 Claims, 11 Drawing Sheets

OTHER PUBLICATIONS

Makosch, G. et al., "Surface profiling by electro–optical phase measurements" *SPIE vol. 316* (1981); pp. 42–53.

"Numerical Recipes, The Art Scientific Computing" by Press, Flannery, Teukolsky and Vetterling, published by Cambridge University Press 1988, 3.2 Rational Functional Interpolation and Extrapolation, pp. 83–85.

Azzam, R. et al., "Ellipsometry And Polarized Light" *Elsevier Science B.V.* (1977, 1987), pp. 282–287.

Fujiwara, H. et al., "Depth–profiles in compositionally–graded amorphous silicon alloy thin films analyzed by real time spectroscopic ellipsometry" *Elsevier Science S.A.* pp. 474–478 (1998).

Heavens, O. S., "Optical Properties of Thin Solid Films" *Dover Publications, Inc* .(1991), pp. 62–73.

Jennewin, H. et al., "Interferometrical Profilometry at Surfaces with Varying Materials" *SPIE vol. 3677* (1999), pp. 1009–1016.

Kildemo, M. et al., "Measurement of the absorption edge of thick transparent substrates using the incoherent reflection model and spectroscopic UV—visible—near IR ellipsometry" *Elsevier Science S.A.* pp. 108–113 (1998).

Kim, Gee–Hong et al., "White light scanning interferometry for thickness measurement of thin film layers" *SPI vol. 3783* (1999), pp. 239–246.

* cited by examiner

SURFACE PROFILING USING A DIFFERENTIAL INTERFEROMETER

FIELD OF THE INVENTION

The present invention relates to measuring the surface profile of a feature, and in particular to measuring the surface profile using a differential interferometer.

BACKGROUND

Differential interferometers are known in the art. For general information relating to differential interferometers, the reader is directed to "LASSI—a scanning differential ac interferometer for surface profile and roughness measurement" by G. Makosch, SPIE Vol. 1009, Surface Measurement and Characterization (1988), pp. 244–253, which is incorporated herein by reference. In a conventional differential interferometer, a beam of light, such as a laser, is decomposed into two orthogonally polarized beams, a reference beam and a measurement beam. The optical phase difference between the two beams is varied using a voltage-controlled modulator. Using beam splitting optics, e.g., consisting of a Wollaston-prism combined with a microscope, the two beams are focused onto and reflected back from a sample surface. On reflection, the two beams are recombined, e.g., using a Wollaston-prism, and partially reflected by a beam splitter to a photon detector. The detected total intensity, I, in a differential interferometer is given by the following equation:

$$I = I_1 + I_2 + 2\sqrt{I_1 I_2} \cos(\phi - \phi_M) \qquad \text{eq. 1}$$

where $I_1$ and $I_2$ are the respective intensities of the two beams, $\phi$ is the phase difference between the two beams due to the reflections on the sample and the optical path difference of the two beam in the optical system, and $\phi_M$ is the induced phase shift between the two beams introduced by the modulator.

Conventionally, a differential interferometer is used to determine the step height between two regions on a sample or the surface profile of the sample using:

$$\varphi = \varphi_2 + \frac{4\pi h}{\lambda} - \varphi_1 \qquad \text{eq. 2}$$

where $\phi_1$ and $\phi_2$ are the phase shift of the reference beam and the measurement beam due to reflection, respectively, h is the step height between the two regions being illuminated, and $\lambda$ is the wavelength of light. The phase $\phi$ is measured by the differential interferometer. Conventionally, the sample is optically characterized prior to the differential interferometer to determine the reference beam phase $\phi_1$ based on the composition and thickness of the film stack and optical constants (n and k values), e.g., using a spectral reflectometer or spectroscopic ellipsometer, as described in U.S. Pat. No. 5,045,704, which is incorporated herein by reference. The optical characterization is done in a uniform region that serves as the reference region. In the beginning of the differential interferometer scan, both the reference and measurement beams sample the reference region. The measurement beam is then scanned across the measurement region. The reference beam phase $\phi_1$ is assumed to be constant during the scan. Thus, a profile of measurement phase $\phi_2$ versus step height h is produced. Because the measurement beam originated the scan from the reference region, the step height h difference between the reference region and the measurement region can be determined.

Unfortunately, the reference phase $\phi_1$ may not be a constant during the differential interferometer scan. For example, the reference beam may pass over a feature, e.g., a cavity or an object above the sample surface, during the scan, which will change the reference beam phase $\phi_1$. The region over which the reference beam passes, may also vary in thickness, which will again change the reference beam phase $\phi_1$. Consequently, the assumption that reference beam phase $\phi_1$ is uniform may be incorrect and may result in errors in step height measurements. Moreover, multiple solutions may be possible for equation 2, giving an ambiguous step height h. In addition, when the measurement beam scans over a composite layer, e.g., having two or more materials, such as copper lines embedded in a silicon dioxide layer, the step height h result will depend on the area fraction of the materials as well as any height differences between the two materials. If the area fraction or the height differences are not known, the resulting step height h or profile result will be unreliable.

It is therefore desirable to derive more information from the reference beam and measurement beam in a differential interferometer to achieve a more accurate step height measurement.

SUMMARY

To accomplish the above and other objects, the present invention overcomes the difficulties of prior art approaches by using the reflectance from the reference and measurement beams in a differential interferometer measurement. The present method is particularly applicable to the samples where the reference and/or measurement regions are not opaque.

A differential interferometer is used to measure the step height between a reference region and at least one point in a measurement region using the phase difference as well as the measured reflectance from at least the point in the measurement region. The measured reflectance can be derived from the information provided by the differential interferometer. The measured reflectance from the reference region can also be used to provide the step height, where, e.g., the reference region has a changing thickness. Where the measurement region includes a composite material, e.g., copper and silicon dioxide, the step height between the reference region and the measurement region may be determined by including the area fraction and/or the height difference of the materials in the composite material in the final determination of the step height.

Thus, in accordance with the present invention, the step height between at least one point in a reference region and at least one point in a measurement region on a sample is measured using a differential interferometer. The phase shift at the reference region is determined, e.g., using a spectroscopic ellipsometer, reflectometer or a library. A differenfial measurement between the reference region and the measurement region is made to determine the measured relative phase shift between the at least one point in the measurement region and the at least one point in the reference region. The phase shift at the measurement region is calculated as a function of the thickness of the material in the measurement region. The measured reflectance from the measurement region is determined. The measured reflectance from the measurement region may be determined using the differential interferometer measurement, along with the known reflectance from the reference region and a differential interferometer measurement taken at the reference region, i.e., two points in the reference region. In addition, the reflectance from the measurement region is calculated as a function of thickness using known values of n and k. The step height between the reference region and the measurement region can then be determined using the phase shift of the reference region, the calculated phase shift from the measurement region, the measured relative phase shift, the measured reflectance from the measurement region and the calculated reflectance from the measurement region. For example, curve fitting can be used to determine the step height between the at least one point in the measurement region and the at least one point in the reference region.

Where the thickness of the material in the reference region changes, the phase shift of the reference region is calculated as a function of thickness, as opposed to being directly measured. The measured reflectance from the reference region is also determined, in a manner similar to the determination of the reflectance from the measurement region. In addition, the reflectance from the measurement region is also calculated as a function of thickness using known values of n and k. The step height is then determined also using the calculated phase shift from the reference region, as well as the measured and calculated reflectance from the reference region.

Where the material in the measurement region includes two different materials having an area fraction, the reflectance and phase from the measurement region is calculated as a function of thickness and area fraction. The calculated reflectance and phase from the measurement region is then used to determine the step height.

Where the material in the measurement region includes two different materials having a height difference, the reflectance and phase from the measurement region is calculated as a function of thickness and height difference. The calculated reflectance and phase from the measurement region is then used to determine the step height.

DETAILED DESCRIPTION

A metrology process, in accordance with the present invention, uses a differential interferometer to accurately measure the step height between two regions on a sample or the profile of a surface region of a sample. The present invention uses the phase from the differential interferometer measurement as well as the reflectance of the measurement beam and, in some embodiments, the reference beam to solve any ambiguity in the step height and to correct for any changes in the reference beam phase $\phi_1$. Where the measurement beam scans over a composite material, e.g., copper lines within a silicon dioxide film, the reflectance of the reference and measurement beams may be used simultaneously with the phase difference to determine the step height between the reference and measurement regions.

Figure 1:
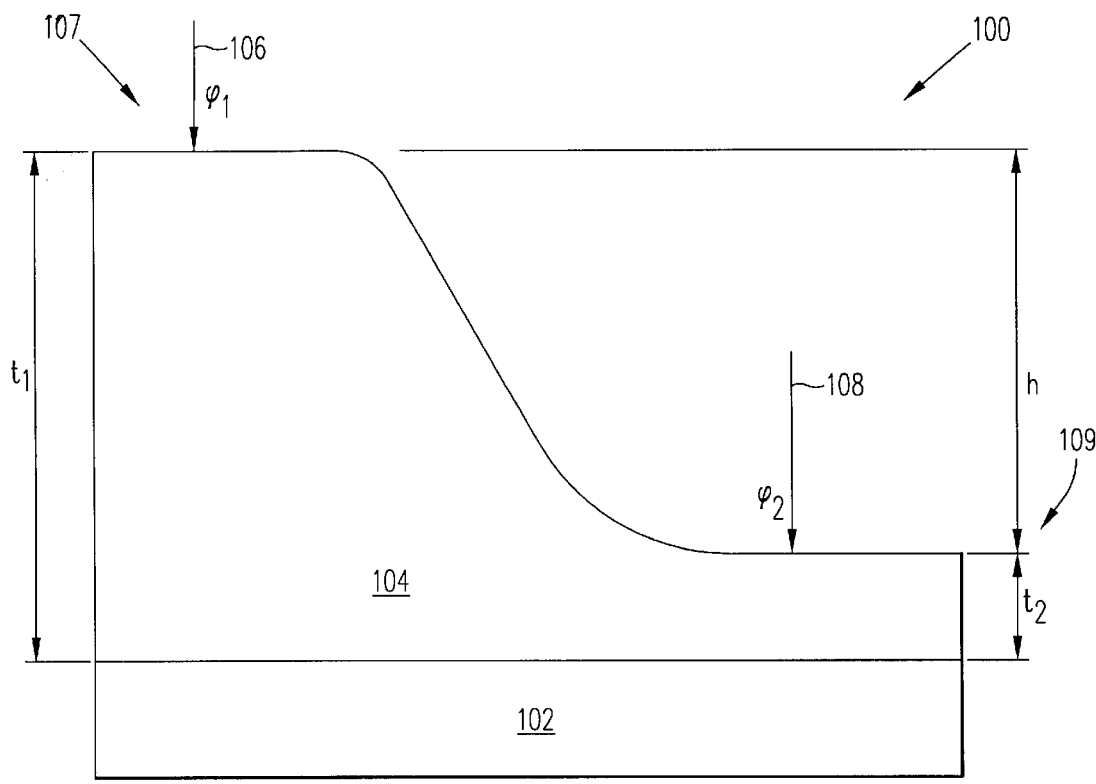
FIGS. 1 and 2 show a respective cross-sectional and perspective view, of a sample that is being measured by a differential interferometer.
Figure 2:
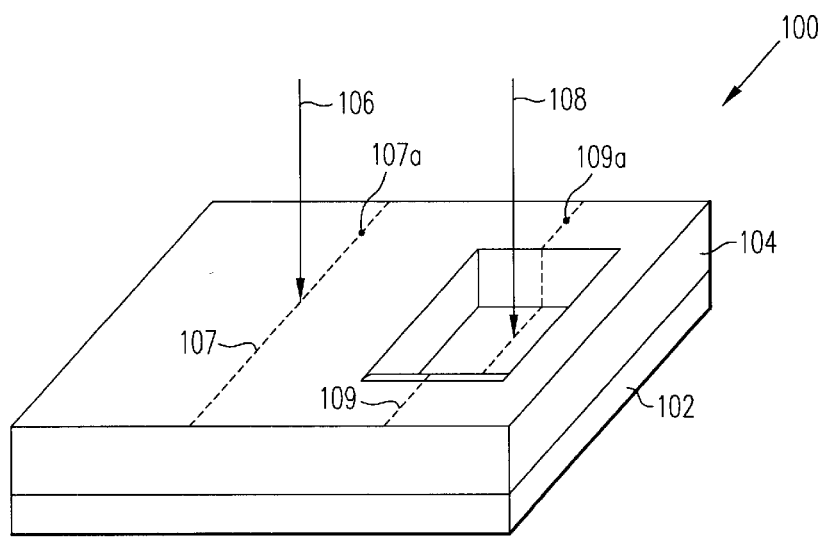

FIGS. 1 and 2 show a respective cross-sectional and perspective view, of a sample 100, including a substrate 102 and an overlying layer 104 that is being measured by a differential interferometer, as illustrated by reference beam 106, with phase $\phi_1$, at reference region 107 and a measurement beam 108, with phase $\phi_2$, at measurement region 109. As shown in FIG. 1, layer 104 has a thickness $t_1$ in the reference region 107 and a minimum thickness $t_2$ in the measurement region 109, where the step height between the reference region 107 and the measurement region 109 is $h=t_1-t_2$. While FIGS. 1 and 2 show reference beam 106 and measurement beam 108 being scanned across sample 100 in parallel lines, it should be understood that the reference beam 106 and measurement beam 108 may be scanned in series, e.g., with reference beam 106 following measurement beam 108 along path 109.

Figure 3:
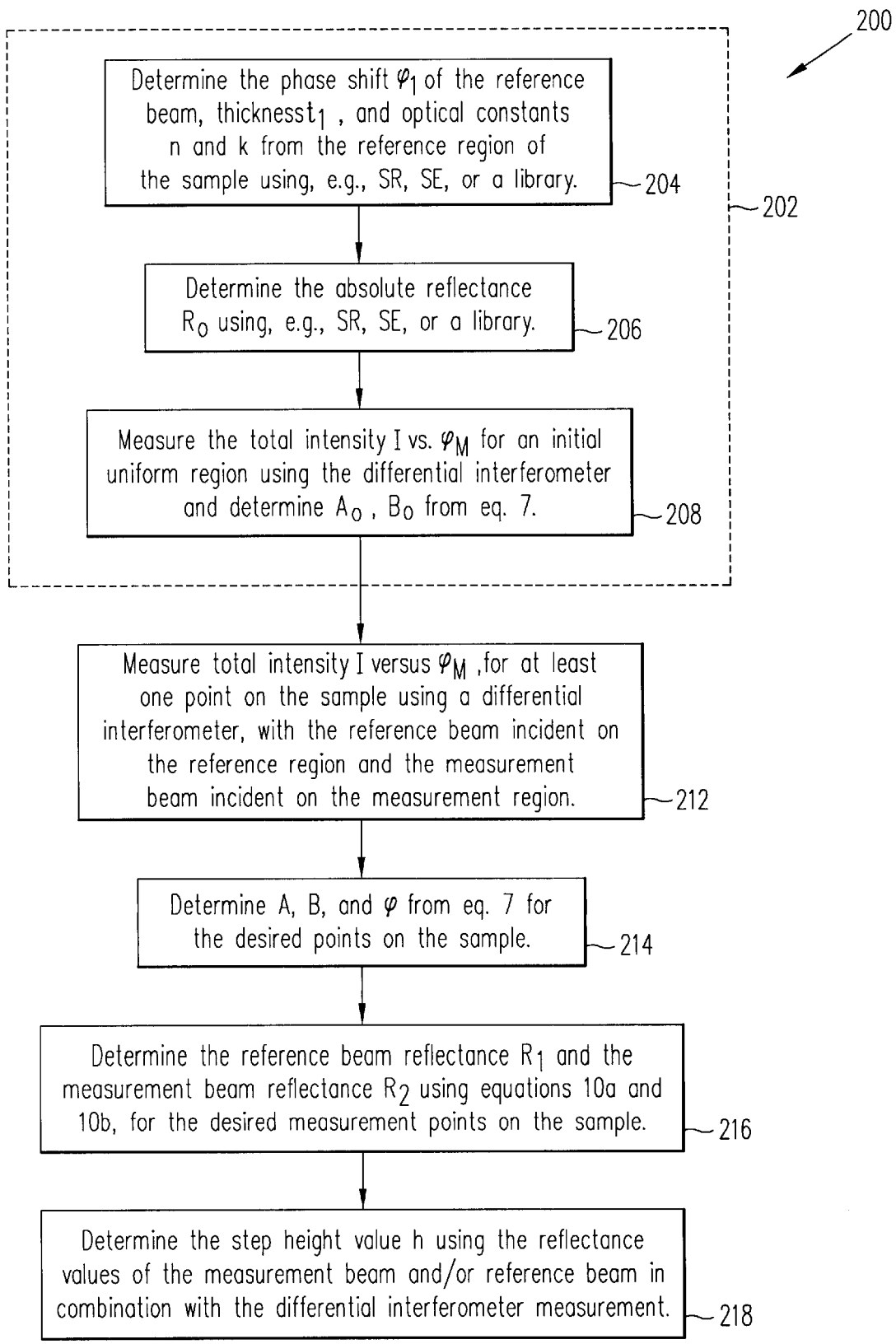
FIG. 3 is a flow chart of the process of determining the step height h between two regions on a sample or the profile of the surface region of the sample.

FIG. 3 is a flow chart 200 of the process of determining the step height h between two regions on a sample or the profile of the surface region of the sample. Prior to the differential interferometer measurement of the sample 100, a calibration process is undertaken (block 202). The calibration procedure determines information including the phase shift $\phi_1$ of the reference beam 106, the thickness $t_1$, and optical constants n and k at the reference region 107 (block 204). Additional information that is determined, includes the reflectance $R_0$ (block 206) and the constant and modulated part of the intensity (referred to herein as $A_0$ and $B_0$, respectively) from an initial differential interferometer measurement at a reference region, i.e., the reference beam 106 and measurement beam 108 are both incident on an area that is uniform with the reference region, such as points 107a and 109a in FIG. 2 (block 208).

The phase shift $\phi_1$ and thickness $t_1$ as well as n and k of the layer 104 at reference region 107 is determined, e.g., using a spectroscopic reflectometer (SR) or spectroscopic ellipsometer (SE). Based on the values of n, k, and $t_1$, the reflection coefficient and the phase change due to the reflection can be calculated from the generalized complex reflection coefficients $r_s$ and $r_p$. The generalized complex reflection coefficients $r_s$ and $r_p$ for the s and p polarizations of a film stack are given by a recursion procedure to the following two equations for each film in the stack:

$$r_s = \frac{r_{sj,j+1} + r_{sj,j-1}\exp(-i2\beta_j)}{1 + r_{sj,j+1}r_{sj,j-1}\exp(-i2\beta_j)} \qquad \text{eq. 3a}$$

$$r_p = \frac{r_{pj,j+1} + r_{pj,j-1}\exp(-i2\beta_j)}{1 + r_{pj,j+1}r_{pj,j-1}\exp(-i2\beta_j)} \qquad \text{eq. 3b}$$

where the following two equations correspond to the standard Fresnel coefficients at the interface between layer i and j:

$$r_{sij} = \frac{n_i\cos\theta_i - n_j\cos\theta_j}{n_i\cos\theta_i + n_j\cos\theta_j} \qquad \text{eq. 4a}$$

$$r_{pij} = \frac{n_i\cos\theta_j - n_j\cos\theta_i}{n_i\cos\theta_j + n_j\cos\theta_i} \qquad \text{eq. 4b}$$

and $\beta_j$ is the phase shift caused by film j upon reflection and is defined as:

$$\beta_j = \frac{2\pi n_j\cos\theta_j t_j}{\lambda} \qquad \text{eq. 5}$$

where $n_j$ is the complex refractive index of film j, $\theta_j$ is the angle of incidence of the measurement beam, $t_j$ is the thickness of film j and $\lambda$ is the wavelength of light. Equations 3a, 3b, 4a, 4b and 5 are described in detail in "Ellipsometry and Polarized Light", by R. M. A. Azzam and N. M. Bashara, Elsevier, Amsterdam, 1999, pp 51–73, which is incorporated herein by reference. Equations 3a and 3b can be rewritten in terms of amplitude $|r|$ and phase $\phi$:

$$r_s = |r_s|e^{-i\phi_s} \qquad \text{eq. 6a}$$

$$r_p = |r_p|e^{-i\phi_p} \qquad \text{eq. 6b}$$

Thus, with the values of $r_s$ and/or $r_p$ known, the phase change that occurs at the reference region 107, i.e., $\phi_1$, can be determined. The value of the phase change $\phi_1$ can be determined using, e.g., a spectroscopic reflectometer or ellipsometer or a library of information.

In a differential interferometer measurement, the incident light is normal to the surface of the sample ($\theta_i=\theta_j=0$). Thus, using equations 6a and 6b, the reflectance R can be written as:

$$R=|r_s|^2=|r_p|^2 \qquad \text{eq. 6c}$$

During the calibration process (block 202), the reflectance $R_0$, which is the ratio of the reflected intensity $I_R$ to the incident intensity $I_0$, i.e., $R_0=I_R/I_0$ (block 206) is determined for the reference region 107. The reflectance $R_0$ is determined using, e.g., a spectroscopic reflectometer or ellipsometer or a library of information.

In addition, during the calibration process (block 202), a differential interferometer measurement of at least two points on the reference region, i.e., points 107a and 109a in FIG. 2, is made (block 208). The differential interferometer measures the total intensity I with respect to an induced optical phase shift $\phi_M$, which is introduced by varying the voltage of the modulator in the differential interferometer (block 208). The detected total intensity I, which is given in equation 1, can be rewritten as $$I=A+B\cos(\phi-\phi_M) \qquad \text{eq. 7}$$

where A and B are the constant and modulated parts of the intensity, respectively.

$$A=I_1+I_2 \qquad \text{eq. 8a}$$

$$B=2\sqrt{I_1 I_2} \qquad \text{eq. 8b}$$

and $$I_{1,2} = \frac{1}{2}\left(A \pm \sqrt{A^2 - B^2}\right) \qquad \text{eq. 9}$$

Here the plus and minus signs for $I_1$ and $I_2$ are arbitrary, i.e., when $I_1$ takes a plus sign, $I_2$ takes a minus sign, and vice versa.

Based on the detected total intensity I versus the induced phase shift $\phi_M$ for the differential interferometer measurement, the values of A, B and $\phi$ can be determined using equation 7 (block 208). Because these values are obtained from a uniform reference region, these values are referred to herein as $A_0$, $B_0$, and $\phi_0$. When the reference beam 106 and the measurement beam 108 are both incident on the reference region 107, there should be no phase difference $\phi_0$ between the two beams. However, a small value of $\phi_0$ may be detected due to the asymmetry of the optical paths of the reference beam and the measurement beam. This phase difference $\phi_0$ is used as a base point and is subtracted from all the phase values later obtained during the scan. The values of the constant and modulated part of the intensity at the reference region, i.e., $A_0$ and $B_0$, respectively, can be determined by curve fitting, e.g., using a nonlinear-least square fit such as Levenberg-Marquardt algorithm as described in W. H. Press, B. P. Flannery, S. A. Teukolsky, W. T. Vetterling, Numerical Recipes, Cambridge University Press, Cambridge, 1986, which is incorporated herein by reference.

With the calibration process (block 202) complete, the differential interferometer measurements of the sample 100 are made. Measurements of the total intensity I versus the induced phase shift $\phi_M$ are made at least at one location on sample 100 (block 212). If a profile measurement of the surface of sample 100 is to be made, a plurality of points must be measured. For example, the measurement beam 108 may be moved slowly across sample 100, while the modulator in the differential interferometer varies the induced phase shift $\phi_M$ at high frequency. The voltage applied to the modulator is varied at a high enough frequency that one cycle is completed while the beam is moved a distance, e.g., equal to the diameter of the spot size. Of course, the frequency may be varied if desired. Alternatively, if desired, a single location may be measured to obtain a single step height h between the reference region 107 and the measured location.

Using the detected total intensity I versus induced phase shift $\phi_M$ for each measured location and equation 7, the values of A, B, and the phase shift $\phi$ can be determined (block 214) for each measured location in a manner similar to that described in reference to block 208, i.e., by curve fitting. The phase shift $\phi$ determined in block 214 is referred to herein as the measured relative phase shift between the reference region and the measurement region and is sometimes referred to as the experimental phase shift $\phi_{exp}$.

Based on the values of A, B, and the measured relative phase shift $\phi$ for each data point on the sample determined in block 214, as well as the values of $A_0$, $B_0$ and the reflectance $R_0$ determined in block 202, the reflectance of the measurement beam (reflectance $R_2$) as well as the reflectance of the reflectance beam (reflectance $R_1$) can be determined (block 216) for the desired measurement points. The reflectance $R_1$ and the reflectance $R_2$ are determined by:

$$R_1 = \frac{R_0}{A_0 - \sqrt{A_0^2 - B_0^2}} \left( A - \sqrt{A^2 - B^2} \right) \qquad \text{eq. 10a}$$

$$R_2 = \frac{R_0}{A_0 + \sqrt{A_0^2 - B_0^2}} \left( A + \sqrt{A^2 - B^2} \right) \qquad \text{eq. 10b}$$

Because the differential interferometer measurement is used to determine reflectances $R_1$ and $R_2$ as shown in equations 10a and 10b, $R_1$ and $R_2$ are referred to herein as the measured reflectance of the reference region and the measured reflectance of the measured region, respectively, and sometimes referred to as the experimental measured reflectance $R_{exp\_mea}$.

The following is the derivation of equations 10a and 10b. The intensities $I_1$ and $I_2$ of the respective reflected reference beam 106 and measurement beam 108 can be expressed as the reflectance at the two illuminated spots, $R_1$ and $R_2$, and the intensity of the incident beam $I_0$ (the incident beam intensity $I_0$ includes the attenuation in the optical path, except changes due the reflection at the sample). The intensities $I_1$ and I2 can be written as:

$$I_1 = I_0 R1 \qquad \text{eq. 11a}$$

$$I_2 = \alpha I_0 R_2 \qquad \text{eq. 11b}$$

where $\alpha$ accounts for the intensity and attenuation difference between the two beams. The parameter $\alpha$ is a constant for a given system. From equations 9, 11a and 11b, the incident intensity $I_0$ and parameter a can be measured in a uniform region of a sample that provides the same reflectances $R_1 = R_2 = R_0$, such that:

$$I_0 = \frac{1}{2R_0} \left( A_0 \mp \sqrt{A_0^2 - B_0^2} \right) \qquad \text{eq. 12}$$

$$\alpha = \frac{1}{B_0^2} \left( A_0 \pm \sqrt{A_0^2 - B_0^2} \right)^2 \qquad \text{eq. 13}$$

where $A_0$, $B_0$ are the measured A and B values in equation 7 at the initial measurement point. The plus and minus signs in equations 12 and 13 depend on equation 9. Thus, for example, the incident intensity $I_0$ in equation 12 uses a minus sign and parameter $\alpha$ in equation 13 uses a plus sign if the intensity $I_1$ uses a minus sign and intensity $I_2$ uses a plus sign in equation 9, i.e., $I_2 > I_1$. If the system is symmetric for the two beams ($A_0 = B_0$ when $R_1 = R_2 = R_0$), equations 12 and 13 can be simplified to:

$$I_0 = \frac{A_0}{2R_0} \qquad \text{eq. 14}$$

$$\alpha = 1 \qquad \text{eq. 15}$$

For the sake of simplicity, the intensity $I_1$ will use a minus sign and the intensity $I_2$ a plus sign in equation 9. Of course, the expressions for reflectances $R_1$ and $R_2$ will be switched if the signs are assigned differently. From equations 9, 11a and 11b, the reflectances $R_1$ and $R_2$ can be written as:

$$R_1 = \frac{1}{2I_0} \left( A - \sqrt{A^2 - B^2} \right) \qquad \text{eq. 16}$$

$$R_2 = \frac{1}{2\alpha I_0} \left( A + \sqrt{A^2 - B^2} \right) \qquad \text{eq. 17}$$

If the incident intensity $I_0$ and parameter $\alpha$ from equations 12 and 13 are substituted into equations 16 and 17, the reflectances $R_1$ and $R_2$ can be written as shown in equations 10a and 10b. Thus, the differential interferometer may be used to produce the reflectances of the reference beam 106 and the measurement beam 108 as shown in equations 10a and 10b.

The step height value h is then determined using the reflectance of at least the measurement beam, i.e., $R_2$, and the differential interfometer measurements (block 218). The method of obtaining the correct step height h depends on the variables in the profile.

In one illustrative embodiment, shown in FIGS. 1 and 2, the reference region 107 has a constant thickness $t_1$, but the thickness $t_2$ of the measurement region 109 varies. Consequently, the thickness $t_2$ of the layer 104 is the only variable.

Figure 4:
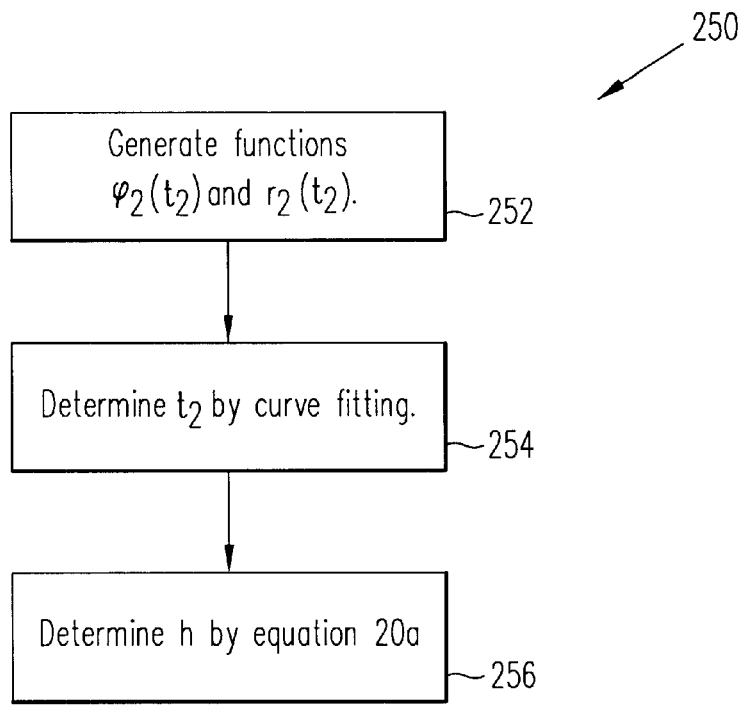
FIG. 4 is a flow chart of the process of determining the step height h, where only the thickness in the measurement region varies.

FIG. 4 is a flow chart 250 of the process of determining the step height h as called for in block 218 of FIG. 3, where only the thickness $t_2$ varies. The step height h is determined from the phase $\phi_2$ of the measurement beam 108 and the reflectance $R_2$ of the measurement beam, using the following equations:

$$\varphi_{exp} = \varphi_2(t_2) + \frac{4\pi h}{\lambda} - \varphi_1(t_1) \qquad \text{eq. 18}$$

$$R_{exp\_mea} = |r_2(t_2)|^2 \qquad \text{eq. 19}$$

$$h = t_1 - t_2 \qquad \text{eq. 20}$$

where $\phi_{exp}$ is the measured relative phase $\phi$ determined in block 214, $\phi_1(t_1)$ is the phase shift at the reference region 107 determined in block 204 (and in this embodiment is a constant), $R_{exp\_mea}$ is the measured reflectance $R_2$ determined in block 216, $r_2(t_2)$ is the complex reflectance of the measurement beam 108, which can be calculated using equations 3a, 3b, 4a, 4b, and 5, where n and k are assumed to be constant so that only $t_2$ varies (and is referred to herein as the calculated reflectance of the measurement region), and $\phi_2(t_2)$ is the phase of complex reflectance $r_2(t_2)$ (and is referred to herein as the calculated phase of the measurement region). The value of $t_1$ was determined in block 204.

Equations 18–20 can be extended to the general case in which the reference region 107 and the measurement regions 109 have different film stacks, i.e., there are layers between substrate 102 and layer 104, by modifying equation 20 to:

$$h = t_1 - t_2 + \delta \qquad \text{eq. 20a}$$

where $\delta$ is the height difference between the reference region 107 and measurement regions 109, excluding the top layer in both regions. The parameter $\delta$ is a positive value when the bottom of the top layer in the reference region 107 is higher than the bottom of the top layer in the measurement region 109.

Figure 5A:
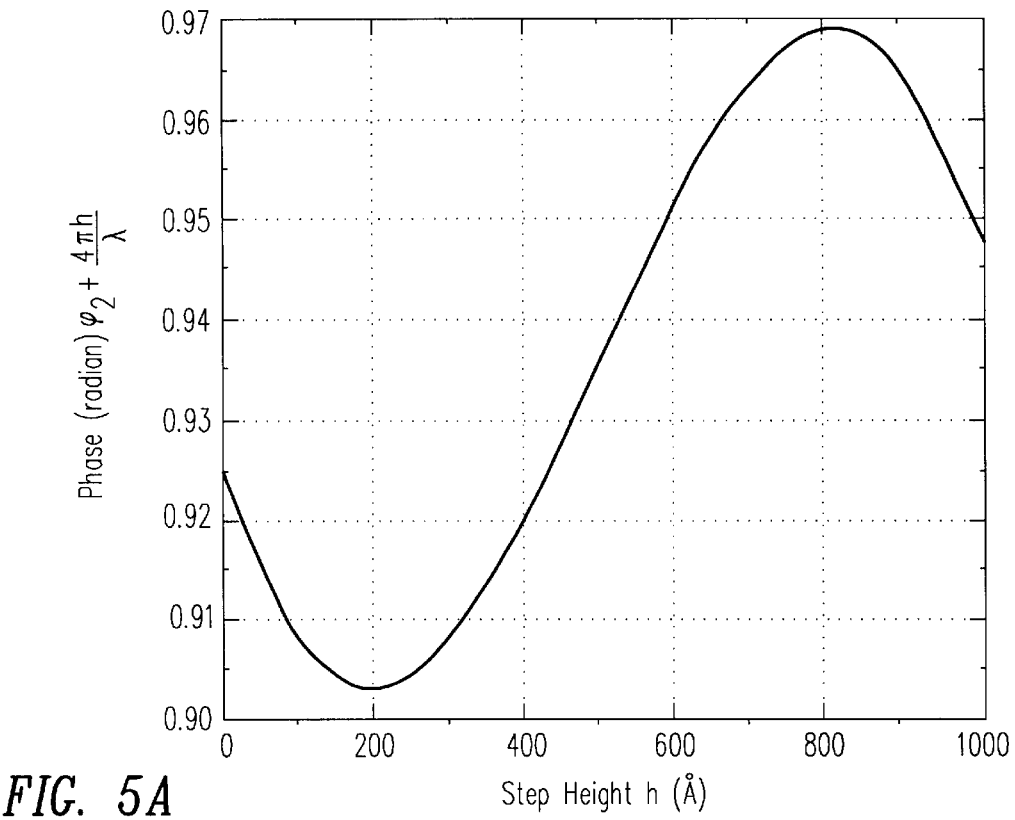
FIG. 5A is a graph showing a simulation of the phase from the measurement region as a function of the step height h.

FIG. 5A is a graph showing a simulation of the phase $(\phi_2 + 4\pi h/\lambda)$ as a function of the step height h (the layer 104 is a SiO2 layer with n=1.456 and k=0.0, and the substrate 102 is a Si with n=3.812 and k=0.013, $\lambda$=6703 Å, and the reference beam phase $\phi_1$ is 0.925 radians). As can be seen in FIG. 5A, in the regions between 0 Å to 400 Å and 600 Å to 1000 Å, the phase is not a monotonic function of the step height; one phase value has two corresponding step height values. Thus, equation 18 alone cannot provide a unique step height h.

Figure 5B:
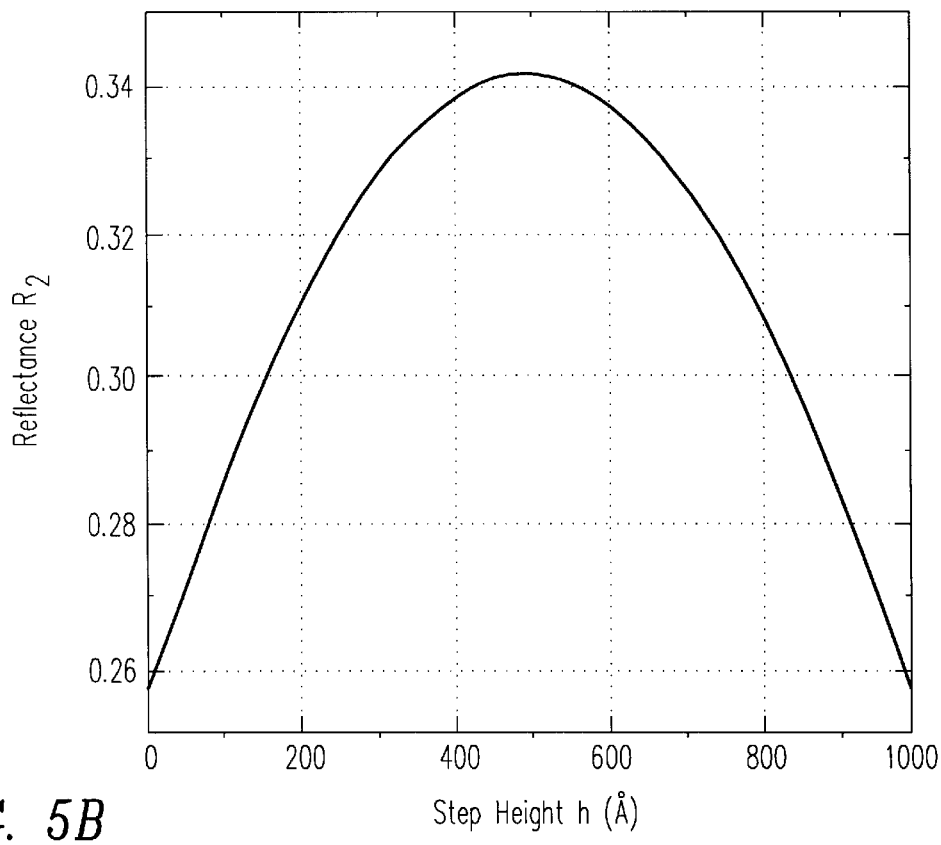
FIG. 5B is a graph showing a simulation of the reflectance from the measurement region as a function of step height h.

FIG. 5B is a graph showing a simulation of the reflectance $R_2$ as a function of step height for a sample having the same parameters as that used in FIG. 5A. As can be seen in FIG. 5B, the reflectance $R_2$ is not a monotonic function of the step height, but within the specific regions between 0 Å to 400 Å and 600 Å to 1000 Å the reflectance $R_2$ is a monotonic function. Thus, in accordance with the present invention, by combining the phase provided by differential interferometer and the reflectance, a unique answer for the step height may be determined. For example, if the measured phase $(\phi_{exp})$ is −0.05 radian and the reference phase $\phi_1$ is 0.925 radian, the phase $\phi_2 + 4\pi h/\lambda$ is 0.920, which according to FIG. 5A indicates the step height h is approximately 10 Å or 400 Å. If the measurement beam reflectance $R_{exp\_mea}$ is 0.338, according to FIG. 5B, the step height is 400 Å or 600 Å. By combining the phase and reflectance a unique answer of 400 Å can be determined. Thus, the answer is unique by combining the phase and reflectance in the measurement beam.

Thus, as shown in FIG. 4, the functions for the calculated phase and reflectance for the measurement region, i.e., $\phi_2(t_2)$ and $r_2(t_2)$, are generated (block 252). Using the value of the measured relative phase, i.e., $\phi_{exp}$, determined in block 214, the value of the measured phase at the reference region 107, i.e., $\phi_1(t_1)$, determined in block 204, the value of the measured reflectance of the measurement region, i.e., $R_{exp\_mea}$, determined in block 216, and the functions for the calculated phase and reflectance for the measurement region, i.e., $\phi_2(t_2)$ and $r_2(t_2)$, the value of $t_2$ may be determined, e.g., using curve fitting (block 254 in FIG. 4) or by inspection of the graphs or using an appropriate look-up table. For example, a new function $f(t_2)$ using equations 18–20 may be constructed as:

$$f(t_2) = \left[\varphi_2(t_2) + \frac{4\pi(t_1 - t_2 + \delta)}{\lambda} - \varphi_1 - \varphi_{exp}\right]^2 w_0 + \qquad \text{eq. 21}$$
$$[|r_2(t_2)|^2 - R_{exp\_mea}]^2 w_1$$

where $w_0$ and $w_1$ are conventional positive weighting factors, which may be set to 1. A nonlinear-least square fit can be used to minimize equation 21 to determine the solution for the thickness $t_2$. An appropriate nonlinear-least square fit that may be used is the Levenberg-Marquardt algorithm as described in W. H. Press, B. P. Flannery, S. A. Teukolsky, W. T. Vetterling, Numerical Recipes, Cambridge University Press, Cambridge, 1986, which is incorporated herein by reference. The step height h may be determined from equation 20a (block 256).

In another embodiment, the sample includes a variable thickness $t_2$ in the measurement region 109 and a variable thickness $t_1$ in the reference region 107. The step height h of such a sample may be derived with a differential interferometer in accordance with an embodiment of the present invention.

Figure 6:
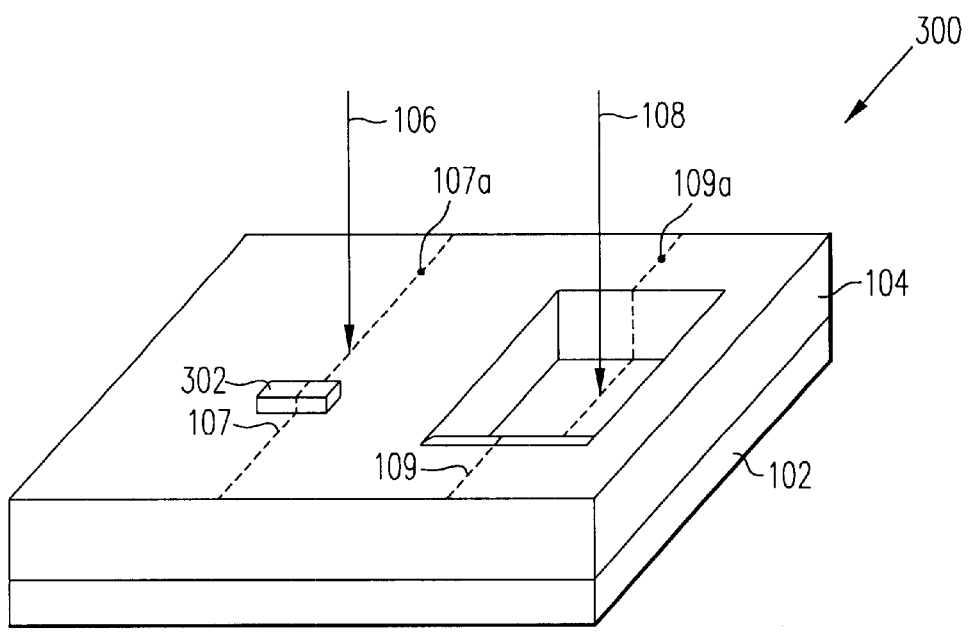
FIG. 6 shows a perspective view of a sample, similar to the sample shown in FIG. 2, except that a feature is located in the path of the reference beam.

FIG. 6 shows a perspective view of a sample 300, which is similar to sample 100 shown in FIG. 2, like designated elements being the same, except that a feature 302 is located in the path of the reference beam 106. It should be understood that the feature 302 may extend above or below the surface of reference region 107. The feature 302 in the reference region 107 will cause the reference beam phase $\phi_1$ to vary. If, as described above, it is assumed that the reference beam phase $\phi_1$ is constant, a variation in the reference beam phase $\phi_1$ will result in an inaccurate step height result. Because feature 302 will also cause the reflectance $R_1$ to change, the reflectance $R_1$ of reference beam 106, as calculated in block 216, can advantageously be used to determine when the reference beam 106 is incident on a feature by comparing one data point against another.

Figure 7:
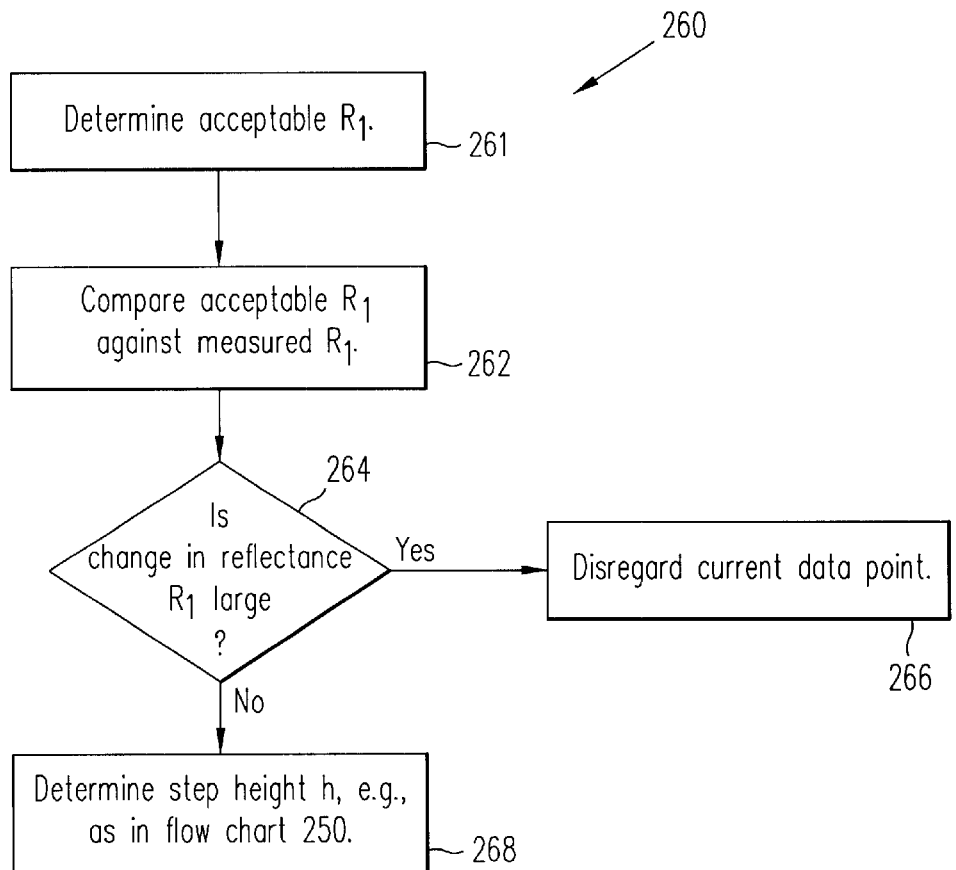
FIG. 7 is a flow chart of determining the step height h, where the reference beam reflectance can be used to determine if the reference beam is incident on a feature.

FIG. 7 is a flow chart 260 of determining the step height h, where the sample includes a variable thickness $t_2$ in the measurement region 109 and a variable thickness $t_1$ caused by a feature 302 in the reference region 107. Accept for feature 302, reference region 107 has a constant thickness $t_1$. An acceptable reflectance $R_1$ is determined (block 261). This may be done, e.g., when both the measurement beam 108 and reference beam 106 are in the reference region, at points 109a and 107a. For example, a mean value and standard error may be determined for 100 points in the reference region. The mean value, along with the standard error ($\sigma$), may then be used to qualify the values of the reference beam reflectance $R_1$ in other areas. As shown in FIG. 7, the acceptable reflectance $R_1$ is compared with the measured reflectance $R_1$ at every measured data point (block 262). A decision is made (block 264) based on whether the difference is large, e.g., greater than 6$\sigma$. If the difference is large, which indicates that the reference beam 106 is incident on a feature 302, the current data point is disregarded (block 266). If the difference is not large, the current data point is not disregarded and the step height h is determined for that data point (block 268), e.g., as described in flow chart 250.

In another embodiment, the reflectance $R_1$ at each measured data point is compared against that of a previous data point. If a significant change occurs, e.g., ±2 percent from the previous data point, the reference beam 106 will be considered incident on a feature 302 and the current data point will be disregarded. Subsequent locations may be measured, where the reflectance $R_1$ for each subsequent data point is compared against the reflectance $R_1$ of the last acceptable data point. If a significant change in reflectance $R_1$ does not occur, the current data point is not disregarded and the step height h is determined for that data point, e.g., as described in flow chart 250.

Figure 8:
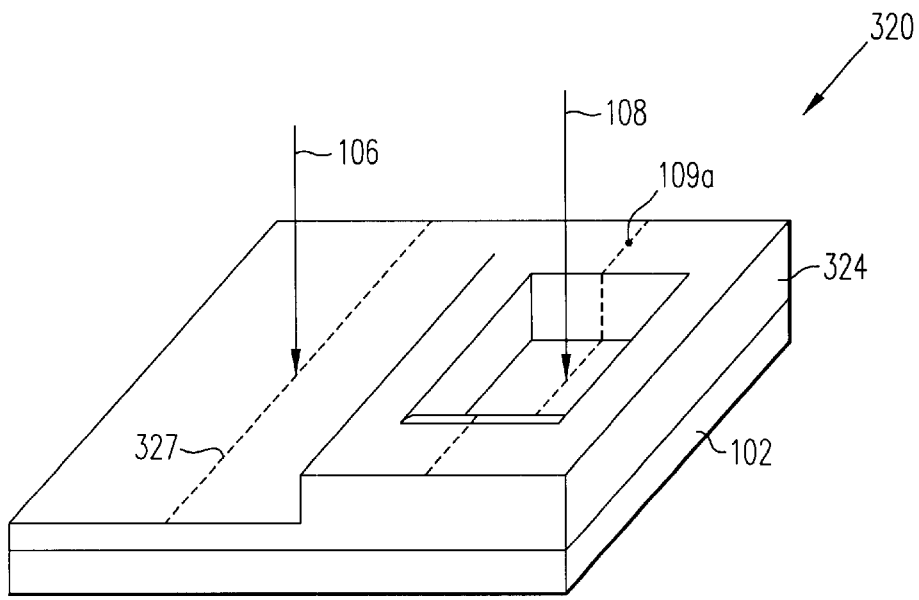
FIG. 8 shows a perspective view of a sample, which is similar to the sample shown in FIG. 2, except that the reference region has a continuously changing thickness.

In another embodiment, the sample has a variable thickness $t_2$ in the measurement region 109 and a continuously changing thickness $t_1$ in the reference region 107, which is not caused by a feature. The step height h of such a sample may be derived, in accordance with an embodiment of the present invention using the reflectance $R_1$ of the reference beam 106, as determined in block 216. FIG. 8 shows a perspective view of a sample 320, which is similar to sample 100 shown in FIG. 2, like designated elements being the same, except that the reference region 327 has a continuously changing thickness $t_1$.

The process of determining the step height h where both the measurement region 109 and the reference region 327 vary in thickness is similar to the process described above in reference to FIG. 3. However, because the thickness $t_1$ of the layer 324 varies in the reference region 327, the reference beam phase $\phi_1$ will vary, which, if unaccounted for, will produce an inaccurate step height h measurement. Consequently, in this embodiment, the phase shift $\phi_1$ and thickness $t_1$ determined in block 204 of FIG. 3 will not be accurate over the entire reference region 107. Thus, there is no need to determine $\phi_1$ as indicated in block 204, but the value of the thickness $t_1$ at the initial measurement point determined in block 204 may be used as base value.

Figure 9:
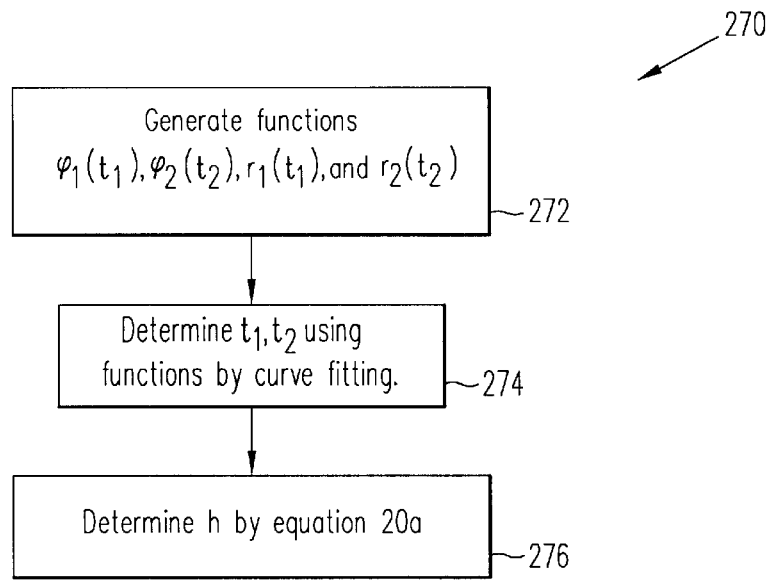
FIG. 9 is a flow chart of determining the step height h, where the thickness in the measurement region and the thickness in the reference region vary.

FIG. 9 is a flow chart 270 of determining the step height h as called for in block 218 of FIG. 3, where the sample includes a variable thickness $t_2$ in the measurement region 109 and a variable thickness $t_1$ in the reference region 107. In this embodiment, the step height h is determined using the calculated phase and reflectance of the measurement region 109, i.e., $\phi_2(t_2)$ and $r_2(t_2)$, respectively, as well as the calculated phase and reflectance of the reference region 107, i.e., $\phi_1(t_1)$ and $r_1(t_1)$, respectively.

Figure 10A:
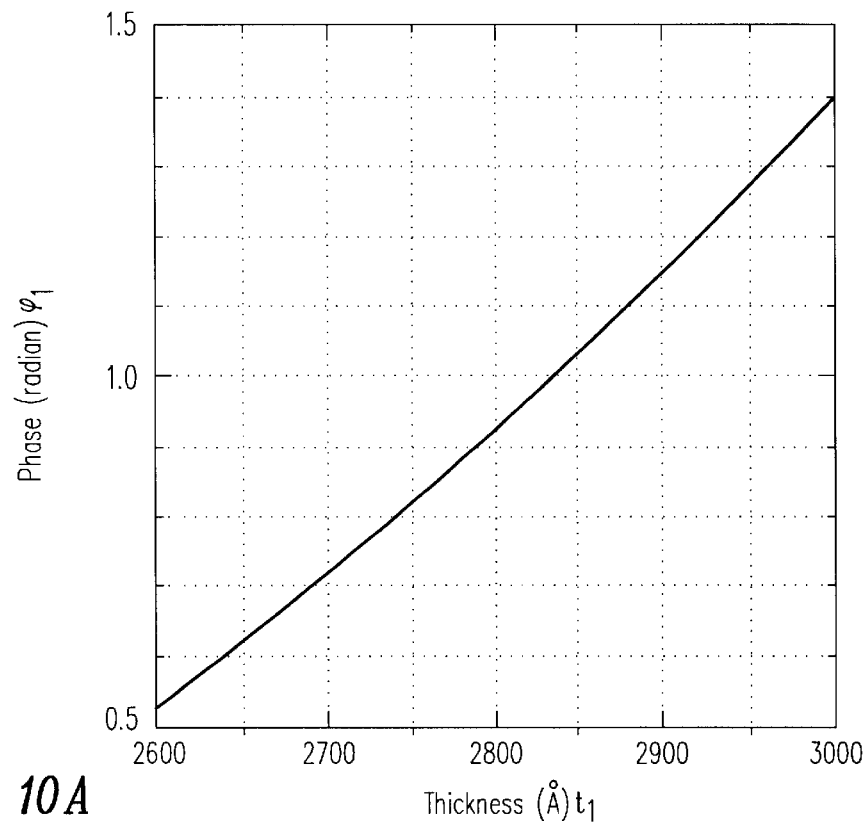
FIG. 10A is a graph showing a simulation of the phase from the reference region as a function of the thickness.
Figure 10B:
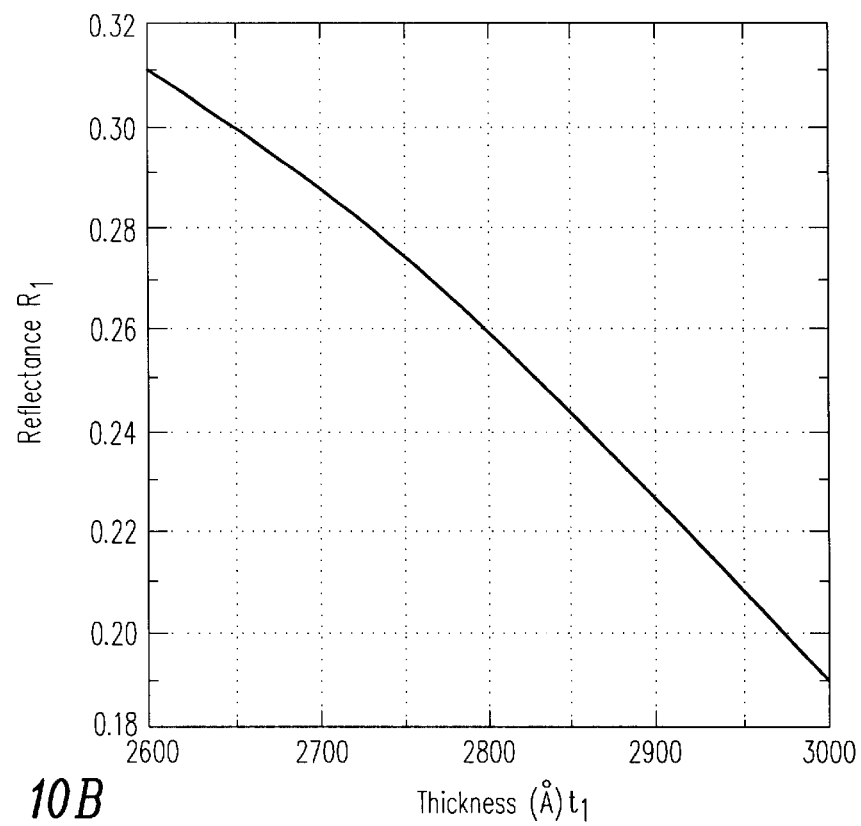
FIG. 10B is a graph showing a simulation of the reflectance from the reference region as a function of the thickness.

FIG. 10A is a graph showing a simulation of the phase $\phi_1$ as a function of the thickness $t_1$, of layer 324 in the reference region 327 which ranges from 2600 Å to 3000 Å, (the layer 354 has an n=1.456 and k=0.0, and the substrate 102 has an n=3.812 and k=0.013). As can be seen in FIG. 10A, when the thickness changes from 2800 Å to 2750 Å, the phase $\phi_1$ changes from 0.925 radian to 0.820 radian. If these variations in phase $\phi_1$ are not detected and considered, significant errors will be introduced in the step height h results. FIG. 10B is a graph similar to that shown in FIG. 10A, but showing a simulation of the reflectance $R_1$ of the reference beam 106 as a function of the thickness $t_1$. Thus, if the measured reflectance $R_1$ of the reference beam 106 is 0.274, the film thickness $t_1$ in the reference region will be 2750 Å, which results in a phase of 0.82 radian in the reference region.

Figure 11A:
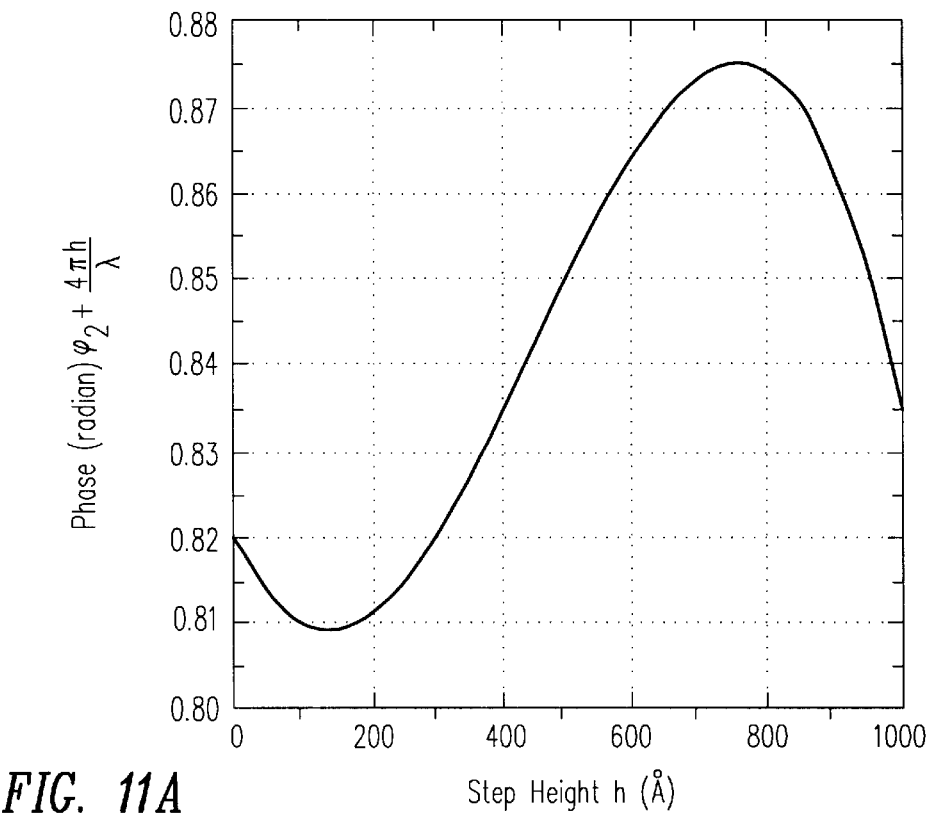
FIG. 11A is a graph showing a simulation of the phase from the measurement region as a function of step height h, where the thickness of the reference region is changed compared to FIG. 5A.
Figure 11B:
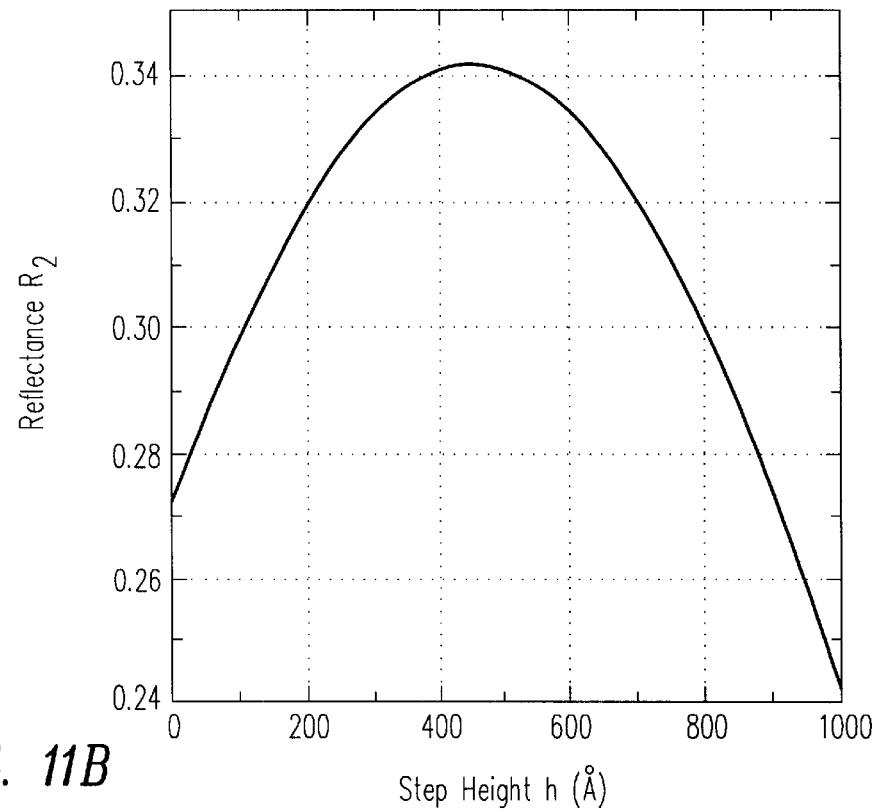
FIG. 11B is a graph showing a simulation of the reflectance from the measurement region as a function of step height h, where the thickness of the reference region is changed compared to FIG. 5B.

FIG. 11A is a graph showing a simulation of the relation of the phase of the measurement beam ($\phi_2+4\pi h/\lambda$) to step height h, which is similar to that shown in FIG. 5A, except that the simulation in FIG. 11A was recalculated based on the changing thickness $t_1$ of the reference region 327. FIG. 11B is a graph showing a simulation of the reflectance $R_2$ as a function of step height h, which is the same as that shown in FIG. 5B, except for the changes caused by the variation in thickness $t_1$ of the reference region 327.

Thus, if the measured phase $\phi$ is −0.01 radian and reflectance $R_2$ for measurement beam 108 is 0.297, then the corresponding step height according to FIGS. 11A and 11B is 92 Å (this corresponds to a phase value ($\phi_2+4\pi h/\lambda$) of 0.81=0.82−0.01, where 0.82 radian is the reference beam phase $\phi_1$). If the change in thickness $t_1$ is ignored, i.e., FIGS. 5A and 5B are used, the corresponding step height h value from FIG. 5A is either 44 Å or 345 Å from the measured phase ($\phi$) value (this corresponds to a phase value ($\phi_2+4\pi h/\lambda$) of 0.915=0.0.925−0.01, where 0.925 radian is the reference beam phase $\phi_1$) and from FIG. 5B is either 140 Å or 850 Å from the reflectance $R_2$ value. Thus, it can be seen that without taking the change in thickness $t_1$ into account, a solution is not possible. A unique answer is possible by combining the phases and reflectances of the measurement beam and the reference beam.

When the measured reflectances $R_1$ and $R_2$ of the reference beam 106 and the measurement beam 108, as determined in block 216 are combined with the measured phase $\phi$ determined in block 214, the step height h can be determined using the following equation, which is combined with equations 18–20.

$$R_{exp\_ref} = |r_1(t_1)|^2 \qquad \text{eq. 22}$$

where $R_{exp\_ref}$ is the measured reflectance $R_1$ at the reference region as determined in block 216, and $r_1(t_1)$ is the complex reflectance of the reference beam 106, which is a function of $t_1$ as described in equations 3a, 3b, 4a, 4b, and 5 (referred to herein as the calculated reflectance in the reference region)), and $\phi_1(t_1)$ is the phase of complex reflectance $r_1(t_1)$ (and is referred to herein as the calculated phase of the reference region).

Thus, as shown in FIG. 9, the functions for the calculated phase and reflectance for the reference region and measurement region, i.e., $\phi_1(t_1)$, $r_1(t_1)$, $\phi_2(t_2)$, and $r_2(t_2)$ are generated (block 272). Using the value of the measured relative phase, i.e., $\phi_{exp}$, determined in block 214, the values of the measured reflectance of the measured region, i.e., $R_{exp\_mea}$, and the measured reflectance of the reference region, i.e., $R_{exp\_ref}$ determined in block 216, and the functions for the calculated phase and reflectance for the reference region and measurement region, i.e., $\phi_1(t_1)$, $r_1(t_1)$, $\phi_2(t_2)$, and $r_2(t_2)$, the values for $t_1$ and $t_2$ can be determined e.g., using curve fitting (block 274 in FIG. 9) or by inspection of the graphs or using an appropriate look-up table. A new function $f(t_1, t_2)$ using equations 18–20, and 22 may be constructed as:

$$f(t_1, t_2) = \left[\varphi_2(t_2) + \frac{4\pi(t_1 - t_2 + \delta)}{\lambda} - \varphi_1(t_1) - \varphi_{exp}\right]^2 w_0 + \qquad \text{eq. 23}$$
$$[|r_1(t_1)|^2 - R_{exp\_ref}]^2 w_1 + [|r_2(t_2)|^2 - R_{exp\_mea}]^2 w_2$$

where $w_0$, $w_1$ and $w_2$ are positive weighting factors. The values of $t_1$ and $t_2$, can be determined by minimizing the function $f(t_1,t_2)$, e.g., using nonlinear-least square fit such as the Levenberg-Marquardt algorithm. The step height h may be determined from equation 20a (block 276).

In accordance with another embodiment of the present invention, a differential interferometer may be used to determine the step height h between two regions on a sample, when the measurement region of the sample is a composite of materials.

Figure 12:
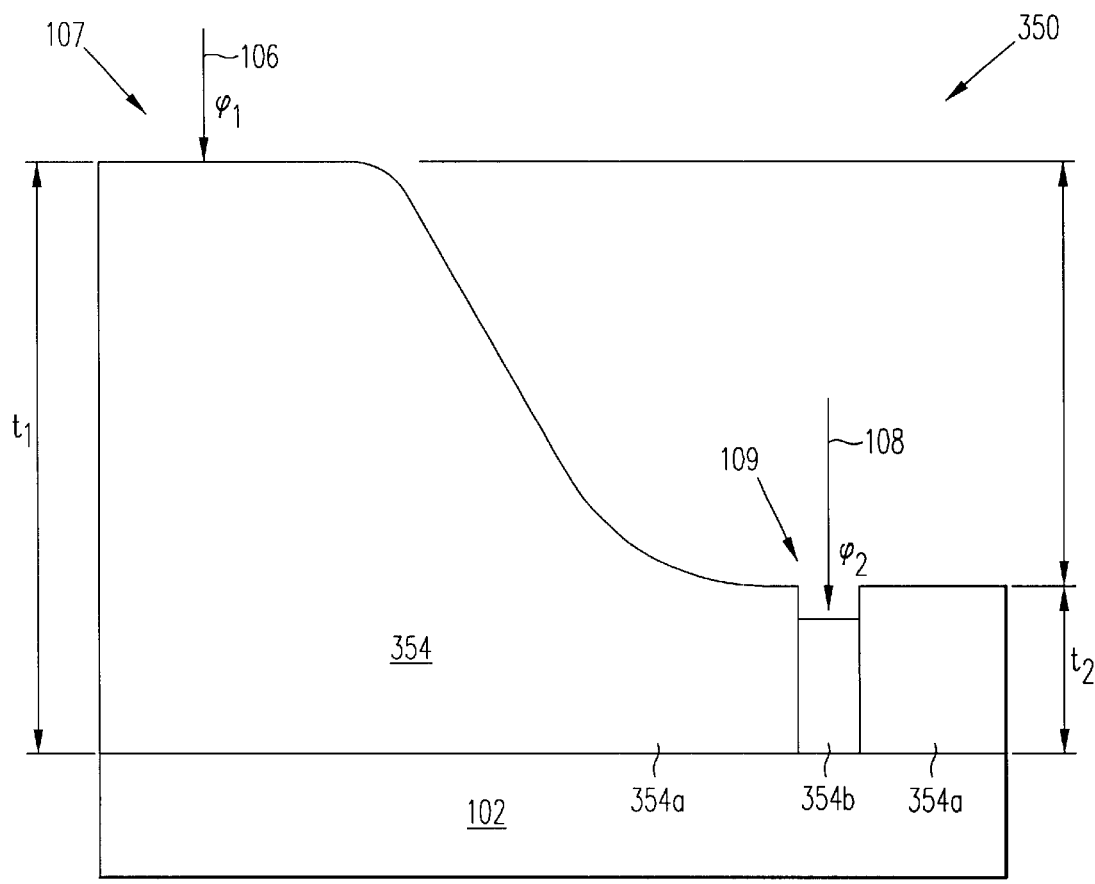
FIG. 12 shows a cross sectional view of a sample, which is similar to the sample shown in FIG. 1, except that the sample includes a composite layer having two different materials.
Figure 13A:
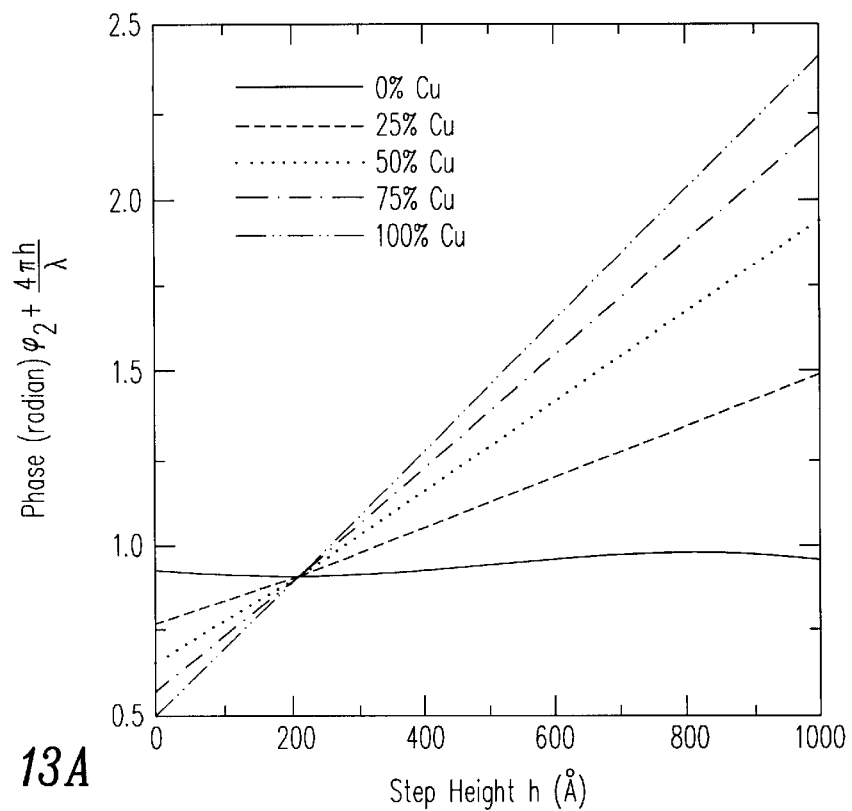
FIG. 13A is a graph showing a simulation of the phase from the measurement region as a function of step height h, where the measurement region includes a composite material having a constant height but a varying area fraction.
Figure 13B:
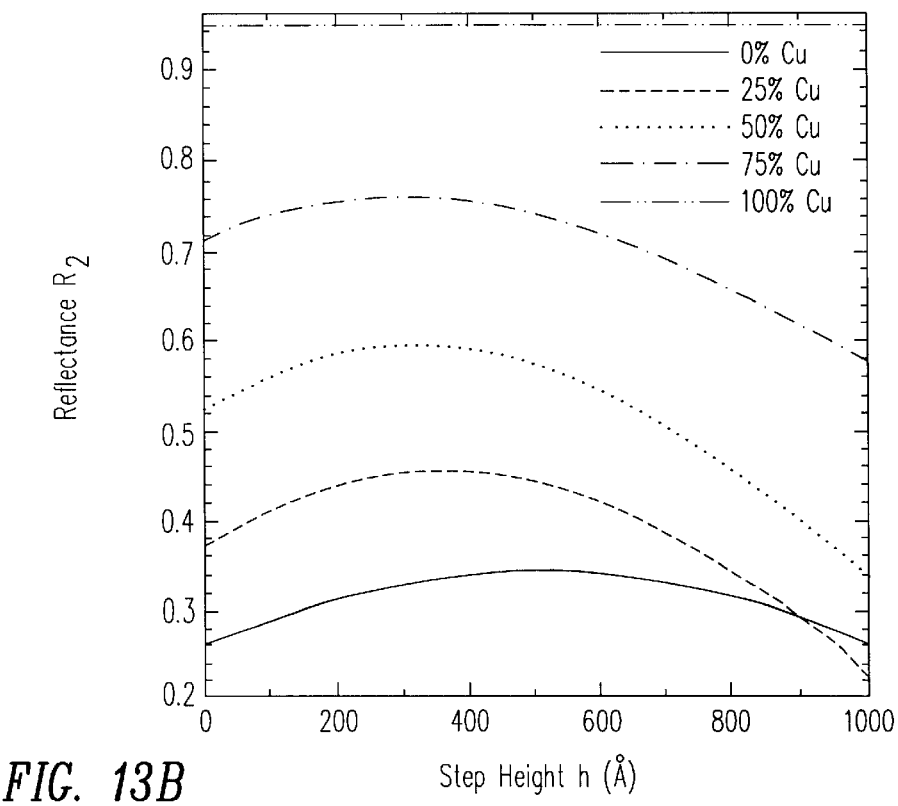
FIG. 13B is a graph showing a simulation of the reflectance from the measurement region as a function of step height h, where the measurement region includes a composite material having a constant height but a varying area fraction.

FIG. 12 shows a cross sectional view of a sample 350, which is similar to sample 100, shown in FIG. 1, like designated elements being the same. Sample 350, however, includes a composite layer 354, including two different materials 354a and 354b, overlying substrate 102. When the measurement region 109 consists of two or more different materials, as shown in FIG. 12, the measurement beam phase $\phi_2$ and reflectance $R_2$ are a function of the area fraction $a_1$ of each material and the height difference between the materials in the measurement region 109. For example, assuming layer 354a is SiO2 and layer 354b is copper Cu and have the same height, when the area fraction $a_1$ of Cu layer 354b changes, the phase ($\phi_2+4\pi h/\lambda$) and the reflectance $R_2$ from measurement beam 108 changes as shown in respective FIGS. 13A and 13B (the optical parameters used in FIGS. 13A and 13B are the same as those used in FIGS. 5A and 5B, and Cu layer 354b has n=0.22 and k=3.84.

Figure 14:
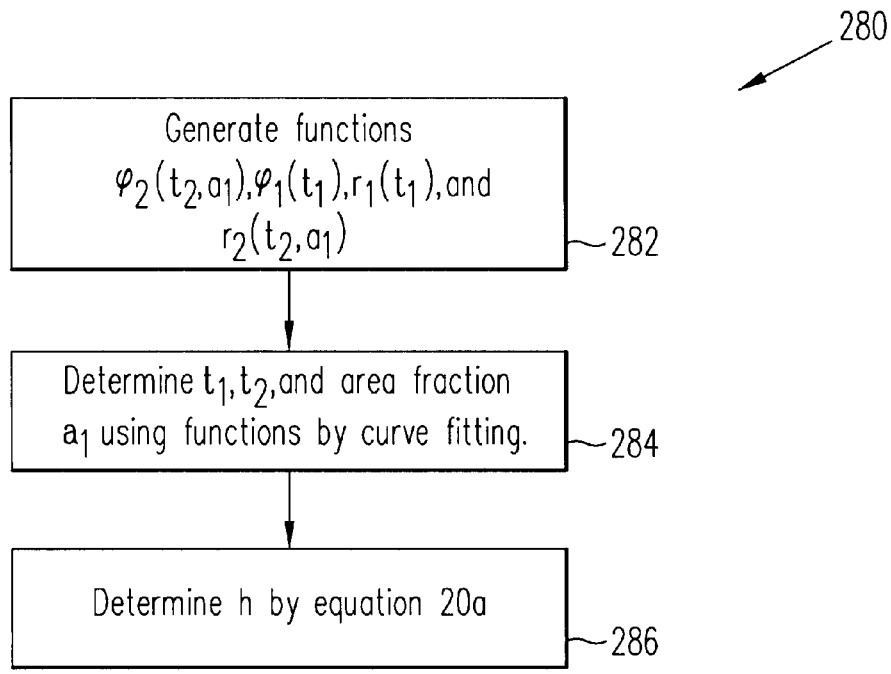
FIG. 14 is a flow chart of determining the step height h, where the measurement region includes a composite material having a constant height but a varying area fraction.

FIG. 14 is a flow chart 280 of determining the step height h as called for in block 218 of FIG. 3, where the thickness $t_1$ of the material in the reference region continuously changes and the measurement region of the sample is a composite of materials that has an area fraction $a_1$ and approximately the same height, i.e., the height difference between material 354a and 354b in the measurement region 109 is negligible, e.g., less than 20 Å. In this embodiment, the step height h is determined using the calculated phase and reflectance of the reference region 107, i.e., $\phi_1(t_1)$ and $r_1(t_1)$, respectively, and the calculated phase and reflectance of the measurement region 109, i.e., $\phi_2(t_2, a_1)$ and $r_2(t_2, a_1)$, respectively, which are a function of area fraction $a_1$. Consequently, in this embodiment, the phase shift $\phi_1$ and thickness $t_1$ determined in block 204 of FIG. 3 will not be accurate over the entire reference region 107. Thus, there is no need to determine $\phi_1$ as indicated in block 204, but the value of the thickness $t_1$ at the initial measurement point determined in block 204 may be used as base value. Of course, if the thickness $t_1$ of the material in the reference region were not to vary, the measured phase $\phi_1$ and thickness $t_1$ for the reference region 107 may be used as described in reference to FIG. 4.

As shown in FIG. 14, the functions for $\phi_2(t_2, a_1)$, $\phi_1(t_1)$, $r_1(t_1)$, and $r_2(t_2, a_1)$ are generated (block 282). The values of $t_1$, $t_2$, and $a_1$ are determined from $\phi_2(t_2, a_1)$, $\phi_1(t_1)$, $r_1(t_1)$, and $r_2(t_2, a_1)$, e.g., using curve fitting (block 284) or by inspection of the graphs or using an appropriate look-up table. A new function $f(t_1, t_2a_1)$ using equations 18–20 and 22 may be constructed as:

$$f(t_1, t_2, a_1) = \left[\varphi_2(t_2, a_1) + \frac{4\pi(t_1 - t_2 + \delta)}{\lambda} - \varphi_1(t_1) - \varphi_{\exp}\right]^2 w_0 + \quad \text{eq. 24}$$
$$[|r_1(t_1)|^2 - R_{\exp\_ref}]^2 w_1 + [|r_2(t_2, a_1)|^2 - R_{\exp\_mea}]^2 w_2$$

where $w_0$, $w_1$ and $w_2$ are positive weighting factors. The values $t_1$, $t_2$, and $a_1$, can be determined by minimizing the function $f(t_1, t_2, a_1)$, e.g., using nonlinear-least square fit such as Levenberg-Marquardt algorithm, as described above. The step height h is determined by equation 20a (block 286).

If the thickness $t_1$ does not vary over the reference region, the value $\phi_1$ can be predetermined as described in reference to block 204, in which case only the functions for $\phi_2(t_2, a_1)$ and $r_2(t_2, a_1)$ are generated (block 282) and the values of $t_2$, and $a_1$ are determined from $\phi_2(t_2, a_1)$ and $r_2(t_2, a_1)$, e.g., using curve fitting (block 284). Thus, the step height h is determined as a function of the measurement beam phase $\phi_2$ and reflectance $R_2$ in block 284.

The values of $r_2$ and $\phi_2$ are calculated using a scalar model, for example, as described by Meng-En Lee, "High-Speed Analysis of Surface Topography On Semiconductor Wafers Optical Diffractive Techniques", Ph.D thesis, University of Michigan, 1999, which is incorporated herein by reference. Because the incident light is normal to the surface of the sample, the complex coefficient is described by:

$$r_s = \sum_{i=1}^{N} a_i r_{s,i} \exp\left(\frac{4\pi h_i}{\lambda}\right) \quad \text{eq. 25a}$$

$$r_p = \sum_{i=1}^{N} a_i r_{p,i} \exp\left(\frac{4\pi h_i}{\lambda}\right) \quad \text{eq. 25b}$$

where $r_{s,i}$ and $r_{p,i}$ are the complex reflection coefficients of the s and p polarization for the i-th uniform region. The sum is over all the regions and $a_i$ is a nonnegative real number for the i-th region with the following constraint, $$\sum_{i=1}^{N} a_i = 1 \quad \text{eq. 26}$$

In equation 25, $h_i$ is the height difference on the film stacks for i-th region relative to the highest region (for which $h_i=0$), which is used to account for the phase lag difference introduced by air layer on the top of each region. In this model, it is assumed that light is fully coherent in the sampling region, which is a good approximation when the beam spot size is small, such as when a laser is used as the light source.

In FIGS. 13A and 13B, the curves of different area fraction $a_1$ intercross at different step heights h, which can lead to ambiguous results. To resolve any ambiguity, two or more wavelengths can be used in the differential interferometer measurement. Equation 24 can be applied to each wavelength. When the different wavelengths (equations) are combined together, a unique step height h can be obtained. In practice two different wavelengths may be used, e.g., 6703 Å and 6328 Å.

Figure 15A:
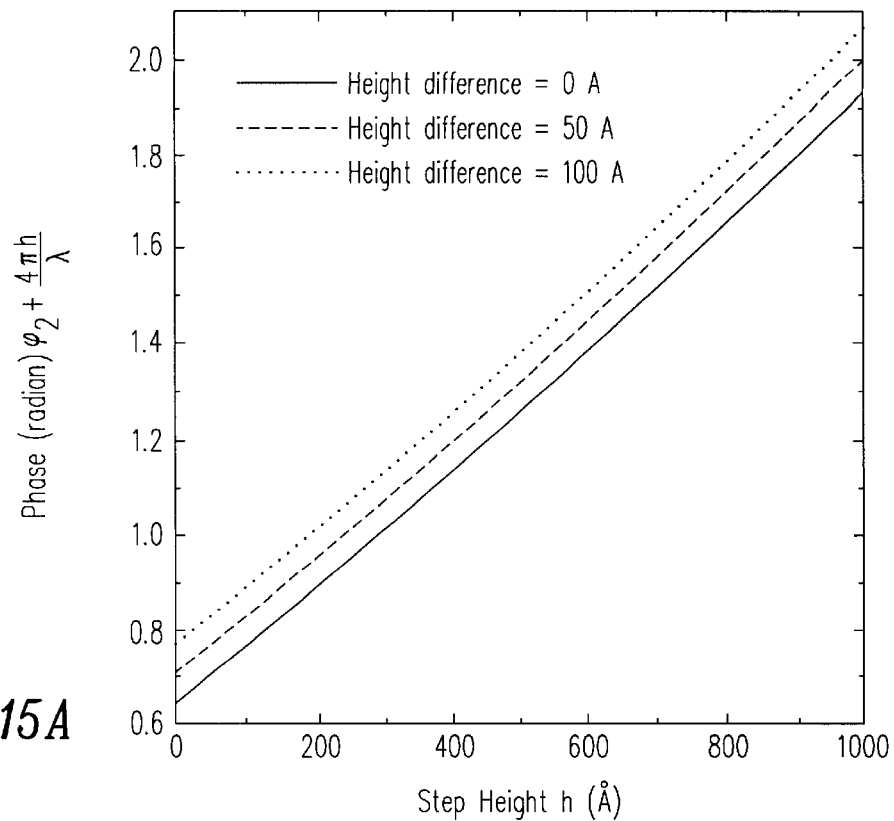
FIG. 15A is a graph showing a simulation of the phase from the measurement region as a function of step height h, where the measurement region includes a composite material having a constant area fraction by a varying height difference.
Figure 15B:
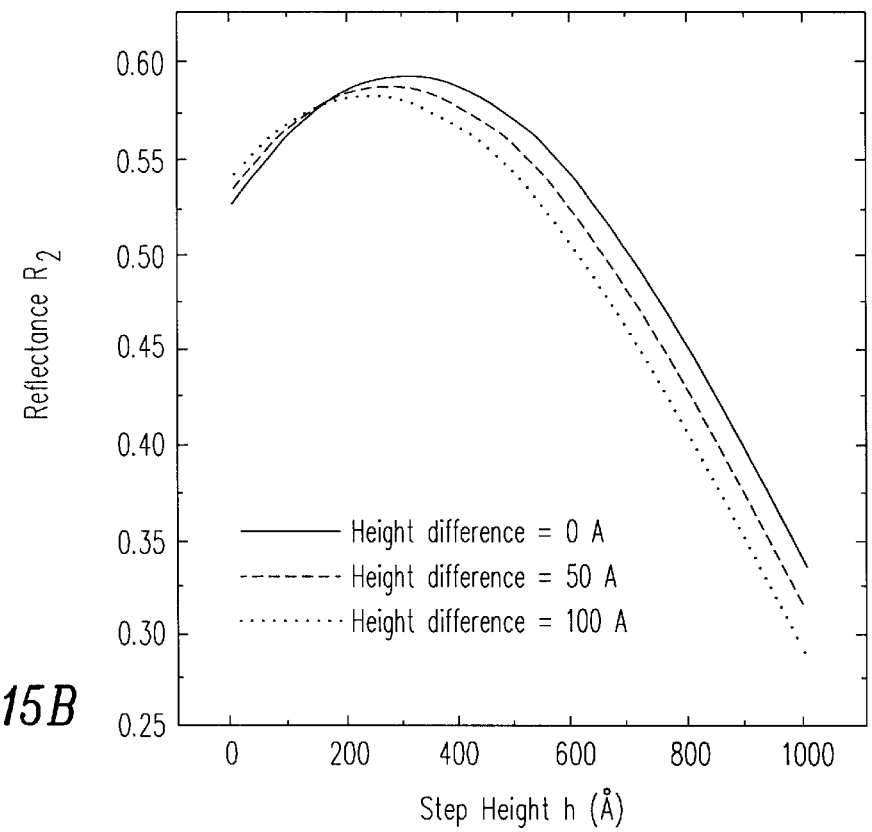
FIG. 15B is a graph showing a simulation of the reflectance from the measurement region as a function of step height h, where the measurement region includes a composite material having a constant area fraction by a varying height difference.

In many cases, however, the area fraction $a_1$ can be predetermined from the processing conditions and remains a constant. The height difference, $\Delta t$, between the different materials, however, may vary with the processing conditions. FIGS. 15A and 15B show the respective phase ($\phi_2+4\pi h/\lambda$) and reflectance $R_2$ of the measurement beam 108 for various height differences between material 354a and material 354b, where the area fraction $a_1$ is fixed at 50 percent.

Figure 16:
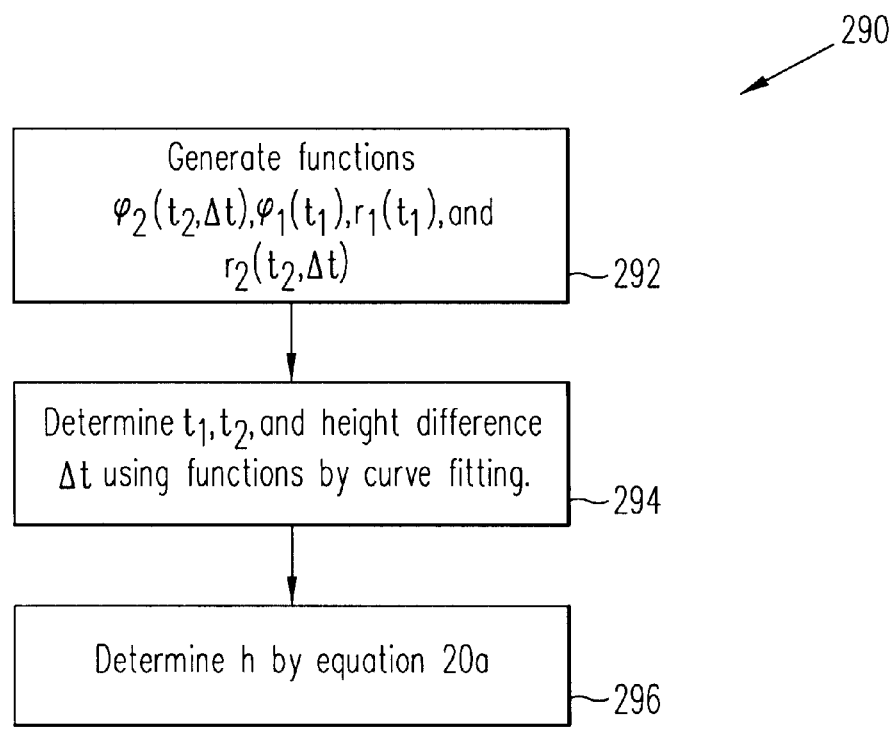
FIG. 16 is a flow chart of determining the step height h, where the measurement region includes a composite material having a constant area fraction by a varying height difference.

FIG. 16 is a flow chart 290 of determining the step height h as called for in block 218 of FIG. 3, where the thickness $t_1$ of the material in the reference region continuously changes and the area fraction $a_1$ is known in the measurement region 109 but the height difference between the two material in the composite material is not known. In this embodiment, the step height h is determined using the calculated phase and reflectance of the reference region 107, i.e., $\phi_1(t_1)$ and $r_1(t_1)$, respectively, and the calculated phase and reflectance of the measurement region 109, i.e., $\phi_2(t_2, \Delta t)$ and $r_2(t_2, \Delta t)$, respectively, which are a function of height difference $\Delta t$. Consequently, in this embodiment, the phase shift $\phi_1$ and thickness $t_1$ determined in block 204 of FIG. 3 will not be accurate over the entire reference region 107. Thus, there is no need to determine $\phi_1$ as indicated in block 204, but the value of the thickness $t_1$ at the initial measurement point determined in block 204 may be used as base value. Of course, if the thickness $t_1$ of the material in the reference region were not to vary, the measured phase $\phi_1$ and thickness $t_1$ for the reference region 107 may be used as described in reference to FIG. 4.

As shown in FIG. 16, the functions for $\phi_2(t_2, \Delta t)$, $\phi_1(t_1)$, $r_1(t_1)$, and $r_2(t_2, \Delta t)$ are generated (block 292). Using $\phi_2(t_2, \Delta t)$, $\phi_1(t_1)$, $r_1(t_1)$, and $r_2(t_2, \Delta t)$, the values of $t_1$, $t_2$, and $\Delta t$ are determined, e.g., using curve fitting (block 294) or by inspection of the graphs or using an appropriate look-up table. A new function $f(t_1, t_2, \Delta t)$ using equations 18–20 and 22 may be constructed as:

$$f(t_1, t_2, \Delta t) = \left[\varphi_2(t_2, \Delta t) + \frac{4\pi(t_1 - t_2 + \delta)}{\lambda} - \varphi_1(t_1) - \varphi_{\exp}\right]^2 w_0 + \quad \text{eq. 27}$$
$$[|r_1(t_1)|^2 - R_{\exp\_ref}]^2 w_1 + [|r_2(t_2, \Delta t)|^2 - R_{\exp\_mea}]^2 w_2$$

where $w_0$, $w_1$ and $w_2$ are positive weighting factors, and $\Delta t$ is the height difference between material 354a and 354b in the measurement region 109. The values $r_2$ and $\phi_2$ can be determined using the scalar model technique described above. The values $t_1$, $t_2$, and $a_1$, can be determined by minimizing the function $f(t_1,t_2,\Delta t)$, e.g., using nonlinear-least square fit such as Levenberg-Marquardt algorithm as described above. The step height h is determined by equation 20a (block 296).

If the thickness $t_1$ does not vary over the reference region, the value $\phi_1$ can be predetermined as described in reference to block 204, in which case only the functions for $\phi_2(t_2, \Delta t)$ and $r_2(t_2, \Delta t)$ are generated (block 292) and the values of $t_2$, and $\Delta t$ are determined using curve fitting (block 294). Thus, the step height h is determined as a function of the measurement beam phase $\phi 2$ and reflectance $R_2$ in block 294.

The curves of FIGS. 15A and 15B, similar to that of FIGS. 13A and 13B, may still lead to ambiguous results. Any ambiguity may be resolved by using a plurality of wavelengths in the differential interferometer measurement, as described above.

Although the present invention is illustrated in connection with specific embodiments for instructional purposes, the present invention is not limited thereto. Various adaptations, modifications, and combinations may be made without departing from the scope of the invention. For example, various combinations of the embodiments may be used, including, e.g., a feature 302 located in the reference region, where the reference region also continuously changes or where the measurement region includes two different materials. Moreover, it should be understood that a metrology process may be used with wafers, flat panel displays or any other device in which the measurement of the step height or profile is desired. Further, it should be understood that the data may be stored in a computer readable medium and manipulated mathematically using, e.g., an appropriate processor or microprocessor reading software, which may be written by one of ordinary skill in the art in light of the present disclosure. Therefore, the spirit and scope of the appended claims should not be limited to the foregoing description.

What is claimed is:

1. A method of measuring the step height between at least one point in a reference region and at least one point in a measurement region on a sample using a differential interferometer, said method comprising:
    determining the phase shift of said at least one point in a reference region;
    taking a differential measurement to determine the measured relative phase shift between said at least one point in the measurement region relative to said at least one point in the reference region;
    determining the measured reflectance from said at least one point in the measurement region; and
    determining the step height between said at least one point in the measurement region and said at least one point in the reference region using said phase shift of the reference region, said measured relative phase shift, and said measured reflectance from the measurement region.

2. The method of claim 1, wherein determining the phase shift of at least one point in the reference region comprises using one of a spectroscopic reflectometer, spectroscopic ellipsometer, and a library to measure the phase shift from said at least one point in the reference region.

3. The method of claim 1, wherein said determining the step height comprises:
    calculating the phase shift at said at least one point in the measurement region as a function of the thickness of the material at said at least one point in the measurement region;
    calculating a relative phase shift as the difference between said calculated phase shift at said at least one point in the measurement region and said phase shift of said at least one point in a reference region;
    calculating the reflectance of said at least one point in the measurement region as a function of the thickness of the material in the measurement region;
    comparing said measured relative phase shift with said calculated relative phase shift and said measured reflectance with said calculated reflectance; and
    using curve fitting to determine the step height between said at least one point in the measurement region and said at least one point in the reference region.

4. The method of claim 1, wherein determining the measured reflectance from said at least one point in the measurement region comprises:
    measuring the reflectance from the reference region;
    deriving a constant and modulated part of the intensity from said differential interferometer measurement between said at least one point in the measurement region relative to said at least one point in the reference region;
    calculating the reflectance from said at least one point in the measurement region using said reflectance from the reference region and the constant and modulated part of the intensity from said differential interferometer measurement.

5. The method of claim 4, further comprising:
    taking a differential measurement between at least two points on said reference region;
    deriving a constant and modulated part of the intensity from said differential interferometer measurement of said at least two points on said reference region;
    wherein calculating the reflectance from said at least one point in the measurement region further uses said constant and modulated part of the intensity from said differential interferometer measurement of said at least two points on said reference region.

6. The method of claim 4, wherein measuring the reflectance from said initial uniform region comprises using one of a spectroscopic reflectometer, spectroscopic ellipsometer, and a library.

7. The method of claim 1, wherein determining the measured relative phase shift between the measurement region and the reference region comprises:
    measuring the total intensity versus modulated phase of the differential interferometer; and
    using curve fitting to determine the measured relative phase shift.

8. The method of claim 1, further comprising measuring the step height between a plurality of points in the reference region and a plurality of points in the measurement region, said method further comprising:
    determining the measured reflectance from each of said plurality of points in the reference region; and determining if the reference region includes a feature by comparing the measured reflectance from each point in the reference region to an expected reflectance value.

9. The method of claim 8, further comprising disregarding a data point if the measured reflectance from a point in the reference region is different than the expected reflectance value by more than a predetermined amount.

10. The method of claim 1, wherein determining the phase shift of said at least one point in a reference region comprises calculating the phase shift at said at least one point in the reference region as a function of the thickness of the material at said at least one point in the reference region, said method further comprising:

determining the measured reflectance from at least one point in the reference region; and wherein determining the step height between said at least one point in the measurement region and said at least one point in the reference region further uses the measured reflectance from the reference region.

11. The method of claim 10, wherein said determining the step height comprises:

calculating a relative phase shift as the difference between said calculated phase shift at said at least one point in the measurement region and said calculated phase shift of said at least one point in a reference region;

calculating a first reflectance as a function of the thickness of the material at said at least one point in the measurement region, said first reflectance is from at least one point in the measurement region;

calculating a second reflectance as a function of the thickness of the material at said at least one point in the reference region, said second reflectance is from at least one point in the reference region;

comparing said measured relative phase shift with said calculated relative phase shift and said measured reflectance from said measurement region with said first reflectance and measured reflectance from said reference region with said second reflectance; and using curve fitting to determine the step height between said at least one point in the measurement region and said at least one point in the reference region.

12. The method of claim 1, wherein the measurement region includes at least two different materials having an area fraction, and said determining the step height comprises:

calculating the phase shift at said at least one point in the measurement region as a function of the thickness of the material and said area fraction at said at least one point in the measurement region;

calculating a relative phase shift as the difference between said calculated phase shift at said at least one point in the measurement region and said phase shift of said at least one point in a reference region;

calculating the reflectance from at least one point in the measurement region as a function of the thickness of the material and said area fraction at said at least one point in the measurement region;

comparing said measured relative phase shift with said calculated relative phase shift and said measured reflectance from said measurement region with said calculated reflectance; and using curve fitting to determine the step height between said at least one point in the measurement region and said at least one point in the reference region.

13. The method of claim 1, wherein the measurement region includes at least two different materials having a height difference, and said determining the step height comprises:

calculating the phase shift at said at least one point in the measurement region as a function of the thickness of the material and said height difference at said at least one point in the measurement region;

calculating a relative phase shift as the difference between said calculated phase shift at said at least one point in the measurement region and said phase shift of said at least one point in a reference region;

calculating the reflectance from said at least one point in the measurement region as a function of the thickness of the material and said height difference at said at least one point in the measurement region;

comparing said measured relative phase shift with said calculated relative phase shift and said measured reflectance from said measurement region with said calculated reflectance; and using curve fitting to determine the step height between said at least one point in the measurement region and said at least one point in the reference region.

14. The method of claim 1, wherein taking a differential measurement is performed at a plurality of wavelengths.

15. A method of measuring the step height between at least one point in a reference region and at least one point in a measurement region on a sample using a differential interferometer, said method comprising:

taking a differential measurement between said at least one point in the measurement region relative to said at least one point in the reference region to determine the measured relative phase shift between said at least one point in the measurement region relative to said at least one point in the reference region;

generating a measured reflectance from said at least one point in the measurement region using said differential measurement;

calculating the reflectance at said at least one point in the measurement region as a function of the thickness of the material;

calculating the phase shift at said at least one point in the measurement region as a function of the thickness of the material at said at least one point in the measurement region; and generating the step height between said at least one point in the measurement region and said at least one point in the reference region using at least said measured relative phase shift, said calculated phase shift at said at least one point in the measurement region, said measured reflectance from said at least one point in the measurement region, and said calculated reflectance at said at least one point in the measurement region.

16. The method of claim 15, further comprising:

determining the phase shift of said at least one point in a reference region;

wherein generating the step height further uses said phase shift at said at least one point in the measurement region.

17. The method of claim 16, wherein determining the phase shift of at least one point in the reference region comprises using one of a spectroscopic reflectometer, spectroscopic ellipsometer, and a library to measure the phase shift from said at least one point in the reference region.

18. The method of claim 16, wherein determining the phase shift of said at least one point in a reference region comprises calculating the phase shift at said at least one point in the reference region as a function of the thickness of the material at said at least one point in the reference region, said method further comprising:

generating a measured reflectance from said at least one point in the reference region using said differential measurement; and calculating the reflectance at said at least one point in the reference region as a function of the thickness of the material at said at least one point in the reference region;

wherein generating the step height further uses said measured reflectance from said at least one point in the reference region and said reflectance at said at least one point in the reference region.

19. The method of claim 15, wherein generating a measured reflectance from said at least one point in the measurement region using said differential measurement comprises:

measuring the reflectance from the reference region;

taking a differential measurement between at least two points on said reference region;

deriving a reference constant and modulated part of the intensity from said differential interferometer measurement of said at least two points on said reference region;

deriving a measured constant and modulated part of the intensity from said differential interferometer measurement between said at least one point in the measurement region relative to said at least one point in the reference region;

calculating the reflectance from said at least one point in the measurement region using said reflectance from the reference region and said reference constant and modulated part of the intensity from said differential interferometer measurement and said measurement constant and modulated part of the intensity from said differential interferometer measurement.

20. The method of claim 19, wherein measuring the reflectance from the reference region comprises using one of a spectroscopic reflectometer, spectroscopic ellipsometer, and a library to measure the reflectance from the reference region.

21. A method of measuring the step height between at least one point in a reference region and at least one point in a measurement region on a sample using a differential interferometer, said method comprising:

determining the phase shift of said at least one point in a reference region;

taking a differential measurement to determine the measured relative phase shift between said at least one point in the measurement region relative to said at least one point in the reference region;

calculating the phase shift at said at least one point in the measurement region as a function of the thickness of the material at said at least one point in the measurement region;

calculating a relative phase shift as the difference between said calculated phase shift at said at least one point in the measurement region and said phase shift of said at least one point in a reference region;

determining the measured reflectance from said at least one point in the measurement region;

calculating the reflectance at said at least one point in the measurement region as a function of the thickness of the material;

comparing said measured relative phase shift with said calculated relative phase shift and said measured reflectance with said calculated reflectance; and using curve fitting to determine the step height between said at least one point in the measurement region and said at least one point in the reference region.

22. The method of claim 21, wherein taking a differential measurement is performed at a plurality of wavelengths.

23. A method of measuring the step height between a plurality of points in a reference region and a plurality of points in a measurement region on a sample using a differential interferometer, said method comprising:

taking a differential measurement to determine the measured relative phase shift between said at least one point in the measurement region relative to said at least one point in the reference region;

calculating the phase shift at said at least one point in the reference region as a function of the thickness of the material at said at least one point in the reference region;

calculating the phase shift at said at least one point in the measurement region as a function of the thickness of the material at said at least one point in the measurement region;

calculating a relative phase shift between said at least one point in the measurement region and said at least one point in the reference region as the difference between said calculated phase shift at said at least one point in the measurement region and said phase shift of said at least one point in a reference region;

determining the measured reflectance from said at least one point in the measurement region;

determining the measured reflectance from at least one point in the reference region;

calculating a first reflectance from at least one point in the measurement region as a function of the thickness of the material at said at least one point in the measurement region;

calculating a second reflectance from at least one point in the reference region as a function of the thickness of the material at said at least one point in the reference region;

comparing said measured relative phase shift with said calculated relative phase shift and said measured reflectance from said measurement region with said first reflectance and said measured reflectance from said reference region with said second reflectance; and using curve fitting to determine the step height between said at least one point in the measurement region and said at least one point in the reference region.

24. A method of measuring the step height between at least one point in a reference region and at least one point in a measurement region on a sample using a differential interferometer wherein the measurement region includes at least two different materials having an area fraction, said method comprising:

taking a differential measurement to determine the measured relative phase shift between said at least one point in the measurement region relative to said at least one point in the reference region;

determining the phase shift at said at least one point in the reference region;

calculating the phase shift at said at least one point in the measurement region as a function of the thickness of the material and said area fraction at said at least one point in the measurement region;

calculating a relative phase shift between said at least one point in the measurement region and said at least one point in the reference region as the difference between said calculated phase shift at said at least one point in the measurement region and said phase shift of said at least one point in a reference region;

determining the measured reflectance from said at least one point in the measurement region;

calculating a reflectance from at least one point in the measurement region as a function of the thickness of the material and said area fraction at said at least one point in the measurement region;

comparing said measured relative phase shift with said calculated relative phase shift and said measured reflectance from said measurement region with said calculated reflectance; and using curve fitting to determine the step height between said at least one point in the measurement region and said at least one point in the reference region.

25. A method of measuring the step height between at least one point in a reference region and at least one point in a measurement region on a sample using a differential interferometer wherein the measurement region includes at least two different materials having a height difference, said method comprising:

taking a differential measurement to determine the measured relative phase shift between said at least one point in the measurement region relative to said at least one point in the reference region;

determining the phase shift at said at least one point in the reference region;

calculating the phase shift at said at least one point in the measurement region as a function of the thickness of the material and said height difference at said at least one point in the measurement region;

calculating a relative phase shift between said at least one point in the measurement region and said at least one point in the reference region as the difference between said calculated phase shift at said at least one point in the measurement region and said phase shift of said at least one point in a reference region;

determining the measured reflectance from said at least one point in the measurement region;

calculating a reflectance from at least one point in the measurement region as a function of the thickness of the material and said height difference at said at least one point in the measurement region;

comparing said measured relative phase shift with said calculated relative phase shift and said measured reflectance from said measurement region with said calculated reflectance; and using curve fitting to determine the step height between said at least one point in the measurement region and said at least one point in the reference region.

* * * * *